US012742981B2

(12) United States Patent
Chen

(10) Patent No.: US 12,742,981 B2
(45) Date of Patent: Sep. 22, 2026

(54) OPTICAL ISOLATOR CORE AND OPTICAL ISOLATOR

(71) Applicant: SHENZHEN INNOWAVE TECHNOLOGY CO., LTD., Shenzhen (CN)

(72) Inventor: Guoqiang Chen, Shenzhen (CN)

(73) Assignee: SHENZHEN INNOWAVE TECHNOLOGY CO., LTD., Shenzhen (CN)

( * ) Notice: Subject to any disclaimer, the term of this patent is extended or adjusted under 35 U.S.C. 154(b) by 575 days.

(21) Appl. No.: 18/254,177

(22) PCT Filed: Nov. 12, 2021

(86) PCT No.: PCT/CN2021/130422

§ 371 (c)(1),
(2) Date: May 24, 2023

(87) PCT Pub. No.: WO2022/111314

PCT Pub. Date: Jun. 2, 2022

(65) Prior Publication Data

US 2024/0094569 A1 Mar. 21, 2024

(30) Foreign Application Priority Data

Nov. 26, 2020 (CN) ........................ 202011347618.7

(51) Int. Cl.
*G02F 1/095* (2006.01)

(52) U.S. Cl.
CPC .................................. *G02F 1/0955* (2013.01)

(58) Field of Classification Search
CPC ................... G02F 1/0955; G02F 1/093; G02B 2006/12157; G02B 6/2746; G02B 6/4207; G02B 6/4208; G02B 6/4209
See application file for complete search history.

(56) References Cited

U.S. PATENT DOCUMENTS 5,278,853 A 1/1994 Shirai et al.
5,408,354 A * 4/1995 Hosokawa .............. G02F 1/093
359/489.09

FOREIGN PATENT DOCUMENTS

CN 2499864 7/2002
CN 201072472 Y 6/2008

(Continued)

OTHER PUBLICATIONS

The First Chinese Office Action dated Jun. 24, 2024; Appl. No. 202011347618.7 (11 pages).

(Continued)

*Primary Examiner* — John Bedtelyon

(57) ABSTRACT

An optical isolator core includes: a first birefringent crystal, a Faraday rotator, a second birefringent crystal, and a third birefringent crystal that are successively arranged along a forward optical path. In response to forward o light and forward e light successively traveling through the aforementioned optical elements, displacements of exit points of the forward o light and the forward e light with respect to an incident point are the same, and the forward o light and the forward e light are merged as exiting forward light. In response to backward o light and backward e light successively reversely traveling through the aforementioned optical element, displacements of exit points of the backward o light and the backward e light with respect to the incident point of the forward light causes the backward o light and the backward e light to deviate from the forward optical path.

20 Claims, 12 Drawing Sheets

(56) References Cited

FOREIGN PATENT DOCUMENTS

| | | | |
|---|---|---|---|
| CN | 101782693 | A | 7/2010 |
| CN | 103576346 | A | 2/2014 |
| CN | 204496133 | U | 7/2015 |
| CN | 111722421 | A | 9/2020 |
| CN | 112363332 | Å | 2/2021 |
| JP | H0836146 | | 2/1996 |
| JP | 2002323676 | | 11/2002 |

OTHER PUBLICATIONS

Sun, Aljing, Study on Structure of Optical Isolator, Journal of Xi'an University of Posts and Telecommunications, vol. 8, No. 3,Jul. 31, 2003 ISSN: 2095-6533. Full text, p. 27 left-hand column to p. 30 right-hand column figures 5,6.

* cited by examiner

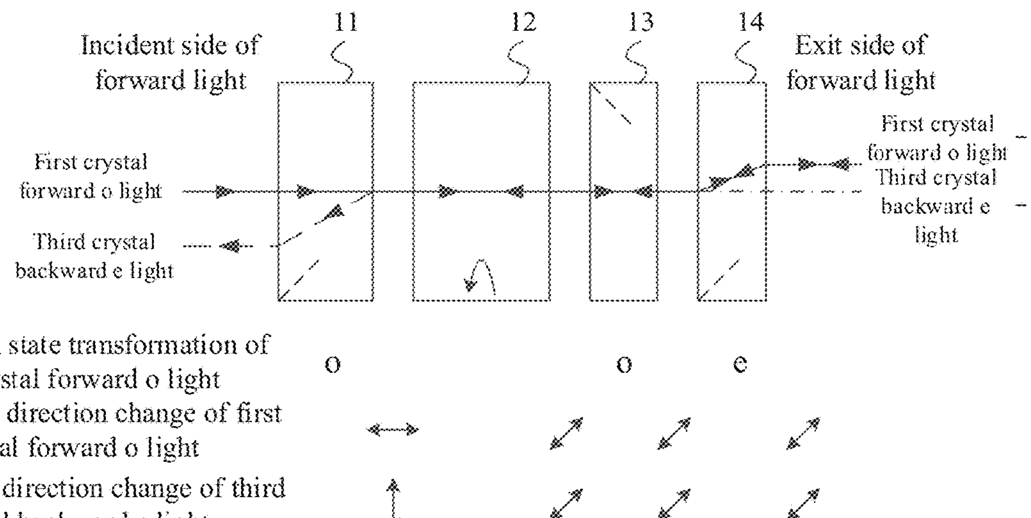

FIG. 10B 11
12
13
14
Incident side of forward light
Exit side of forward light
Third crystal backward o light
First crystal forward e light
First crystal forward e light
Third crystal backward o light
Polarization state transformation of first crystal forward e light
e
e
o
Polarization direction change of first crystal forward e light
Polarization direction change of third crystal backward o light

FIG. 10C

OPTICAL ISOLATOR CORE AND OPTICAL ISOLATOR

CROSS-REFERENCE TO RELATED APPLICATIONS

This application is a National Stage of International Patent Application No. PCT/CN2021/130422 with an international filing date of Nov. 12, 2021, which is based upon and claims priority to Chinese Patent Application No. 202011347618.7, filed with the Chinese Patent Office on Nov. 26, 2020, titled "OPTICAL ISOLATOR CORE AND OPTICAL ISOLATOR", the entire contents of which are incorporated herein by reference.

TECHNICAL FIELD

Embodiments of the present disclosure relate to the technical field of optics, and, relate to an optical isolator core and an optical isolator.

BACKGROUND

A challenge in designing optical products is that backward light causes interferences to incident optical systems of the products. As a consequence, the performance of the entire system is degraded, or even the system crashes. Therefore, in most optical product designs, optical isolator is used to block the backward light from being coupled into the incident optical systems, to yield stable performance and normal functionality. At present, commonly used optical isolator include:

1. Polarization Dependent Isolator

With respect to such isolators, two polarizers and one Faraday rotator are employed, and the Faraday rotator is arranged between the two polarizers. This design, based on the polarization selection feature of the polarizers, only allows the polarized light parallel to the selected direction to travel through, and to absorb the light perpendicular to the selected direction. In forward propagation of light, the incident light parallel to the polarization direction of the first polarizer is capable of losslessly traveling through the first polarizer, the Faraday rotator, and the second polarizer. In backward propagation of light, the light perpendicular to the polarization direction of the second polarizer is absorbed by the second polarizer, and the light parallel to the polarization direction of the second polarizer losslessly travels through the second polarizer and the Faraday rotator and thus is absorbed by the first polarizer because the polarization direction thereof is perpendicular to the polarization direction of the first polarizer. In this way, the backward light is completely isolated, and fails to enter the emitter. Such polarization dependent isolators are applicable to two scenarios of collimating beam and non-collimating beam (convergent beam or divergent beam), which, however, only allow the forward light in a specific polarization state to travel through. This is a polarization dependent design.

2. Polarization Independent Isolator for Collimating Beam

With respect to such isolators, two birefringent crystal wedges and one Faraday rotator are employed. The Faraday rotator is placed between the two birefringent crystal wedges, and wedge orientations of the two birefringent crystal wedges are made opposite to each other. This design is based on the characteristics that coupling efficiency of collimating beam are sensitive to angle difference, a birefringent crystal has different refractive indexes against ordinary light (o light) and extraordinary light (e light), and refraction angles of the light in response to traveling through the same wedge are different. In forward propagation of light, forward o light and forward e light exit from the isolator still along a direction parallel to incident light, and thus is receivable and coupleable by a receiving collimator. In backward propagation of light, backward o light and back e light exit from the isolator at different angles, and form specific angles with the forward incident light. Therefore, the backward light fails to be coupled into the transmitter. In this way, the backward light is isolated. This design is applicable to polarization independent scenarios. However, since this design achieves optical isolation by changing exit angles of the backward light, this design is only applicable to scenarios of isolation for collimating beam but not applicable to isolation for non-collimating beam (convergent beam or divergent beam). This is because that the coupling efficiency of the non-collimating beam is insensitive to the angle difference, and optical isolation fails to be achieved by changing the angles.

In practice of the embodiments of the present disclosure, the inventors have found that the conventional polarization independent optical isolator fails to isolate backward light for the non-collimating beam.

SUMMARY

In view of the above problem, various embodiments of the present disclosure provide an optical isolator core and an optical isolator, to solve the problem in the related art that a polarization independent optical isolator fails to isolate backward light for non-collimating beam.

According to one aspect of the embodiments of the present disclosure, an optical isolator core is provided. The optical isolator core includes: a first birefringent crystal, a Faraday rotator, a second birefringent crystal, and a third birefringent crystal that are successively arranged along a forward optical path. The first birefringent crystal, the Faraday rotator, the second birefringent crystal, and the third birefringent crystal are all parallel plate structures.

In the case that forward light is incident on the first birefringent crystal, the first birefringent crystal is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the Faraday rotator is configured to respectively rotate, at a rotation angle $\alpha$, the polarization directions of the first crystal forward o light and the first crystal forward e light to form rotated first crystal forward o light and rotated first crystal forward e light; the second birefringent crystal is configured to cause the rotated first crystal forward o light and the rotated first crystal forward e light to respectively generate a second displacement of the first crystal forward o light and a second displacement of the first crystal forward e light; and the third birefringent crystal is configured to cause the first crystal forward o light and the first crystal forward e light that travel through the second birefringent crystal to respectively generate a third displacement of the first crystal forward o light and a third displacement of the first crystal forward e light.

A sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal.

In the case that backward light entering backward along the forward optical path is incident on the third birefringent crystal, the third birefringent crystal is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the second birefringent crystal is configured to cause the third crystal backward o light and the third crystal backward e light that travel through the third birefringent crystal to respectively generate a second displacement of the third crystal backward o light and a second displacement of the third crystal backward e light; the Faraday rotator is configured to respectively rotate, at the rotation angle $\alpha$ and along the same direction of the forward light, the polarization directions of the third crystal backward o light and the third crystal backward e light that travel through the second birefringent crystal to form rotated third crystal backward o light and rotated third crystal backward e light; and the first birefringent crystal is configured to cause the rotated third crystal backward o light and the rotated third crystal backward e light to respectively generate a first displacement of the third crystal backward o light and a first displacement of the third crystal backward e light.

A sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

According to another aspect of the embodiments of the present disclosure, an optical isolator core is provided. The optical isolator core includes: a first birefringent crystal, a second birefringent crystal, a Faraday rotator, and a third birefringent crystal that are successively arranged along a forward optical path. The first birefringent crystal, the second birefringent crystal, the Faraday rotator, and the third birefringent crystal are all parallel plate structures.

In the case that forward light is incident on the first birefringent crystal, the first birefringent crystal is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the second birefringent crystal is configured to cause the first crystal forward o light and the first crystal forward e light to respectively generate a second displacement of the first crystal forward o light and a second displacement of the first crystal forward e light; the Faraday rotator is configured to respectively rotate, at a rotation angle $\alpha$, the polarization directions of the first crystal forward o light and the first crystal forward e light that travel through the second birefringent crystal to form rotated first crystal forward o light and rotated first crystal forward e light; and the third birefringent crystal is configured to cause the rotated first crystal forward o light and the rotated first crystal forward e light to respectively generate a third displacement of the first crystal forward o light and a third displacement of the first crystal forward e light.

A sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal.

In the case that backward light entering backward along the forward optical path is incident on the third birefringent crystal, the third birefringent crystal is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the Faraday rotator is configured to respectively rotate, at the rotation angle $\alpha$ and along the same direction of the forward light, the polarization directions of the third crystal backward o light and the third crystal backward e light to form rotated third crystal backward o light and rotated third crystal backward e light; the second birefringent crystal is configured to cause the rotated third crystal backward o light and the rotated third crystal backward e light to respectively generate a second displacement of the third crystal backward o light and a second displacement of the third crystal backward e light; and the first birefringent crystal is configured to cause the third crystal backward o light and the third crystal backward e light that travel through the second birefringent crystal to respectively generate a first displacement of the third crystal backward o light and a first displacement of the third crystal backward e light.

A sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

According to another aspect of the embodiments of the present disclosure, an optical isolator is provided. The optical isolator includes: an input waveguide, a lens, the optical isolator core, and an output waveguide that are successively arranged along a forward optical path.

According to another aspect of the embodiments of the present disclosure, an optical isolator is provided. The optical isolator includes: an input waveguide, the optical isolator core, a lens, and an output waveguide that are successively arranged along a forward optical path.

With the optical isolator core according to the embodiments of the present disclosure, by the parallel plate-structured first birefringent crystal, Faraday rotator, second birefringent crystal, and third birefringent crystal that are successively arranged along the forward optical path, in the case that the forward light travels through the optical isolator core, the first crystal forward o light and the first crystal forward e light are subjected to the same displacement and are coincident with each other in response to exiting from the optical isolator core; and in the case that the backward light travels through the optical isolator core, due to two rotations in the polarization state by the Faraday rotator, the backward light is accumulatively rotated at 90 degrees with respect to the forward light, the forward light and the backward light are subjected to an o/e light polarization state exchange in the first birefringent crystal, and the third crystal backward o light and the third crystal backward e light each deviate with respect to the incident point of the forward light in response to exiting from the first birefringent crystal, such that the third crystal backward o light and the third crystal backward e light deviate from the forward optical path. In this way, the backward light is isolated. Since the first crystal forward o light and the first crystal forward e light are subjected to the same displacement and are coincident with each other in response to exiting from the optical isolator core, the optical isolator core has an extremely high forward coupling efficiency and an extremely low polarization dependent loss. In addition, due to adoption of the approach for causing the backward light to be laterally displaced with respect to the forward light, the optical isolator core is applicable to a non-collimating beam scenario insensitive to angle difference but sensitive to lateral displacements. In this way, optical isolation is implemented in the scenario of polarization independence and non-collimating beam.

With the further optical isolator core according to the embodiments of the present disclosure, by the parallel plate-structured first birefringent crystal, second birefringent crystal, Faraday rotator, and third birefringent crystal that are successively arranged along the forward optical path, in the case that the forward light travels through the optical isolator core, the first crystal forward o light and the first crystal forward e light generate the same displacement and are coincident with each other in response to exiting from the optical isolator core; and in the case that the backward light travels through the optical isolator core, due to two rotations in the polarization state by the Faraday rotator, the backward light is accumulatively rotated at 90 degrees with respect to the forward light, the forward light and the backward light are subjected to an o/e light polarization state exchange in the first birefringent crystal and the second birefringent crystal, and the third crystal backward o light and the third crystal backward e light each deviate with respect to the incident point of the forward light in response to exiting from the first birefringent crystal, such that the third crystal backward o light and the third crystal backward e light deviate from the forward optical path. In this way, the backward light is isolated. Since the first crystal forward o light and the first crystal forward e light are subjected to the same displacement and are coincident with each other in response to exiting from the optical isolator core, the optical isolator core has an extremely high forward coupling efficiency and an extremely low polarization dependent loss. In addition, due to adoption of the approach for causing the backward light to be laterally displaced with respect to the forward light, the optical isolator core is applicable to a non-collimating beam scenario insensitive to angle difference but sensitive to lateral displacements. In this way, optical isolation is implemented in the scenario of polarization independence and non-collimating beam.

The above description only summarizes the technical solutions of the embodiments of the present disclosure. Specific embodiments of the present disclosure are described hereinafter to better and clearer understand the technical solutions of the embodiments of the present disclosure, to practice the technical solutions based on the disclosure of the specification and to make the above and other objects, features and advantages of the embodiments of the present disclosure more apparent and understandable.

BRIEF DESCRIPTION OF THE DRAWINGS

The accompanying drawings are merely for illustrating some exemplary embodiments, but shall not be construed as limiting the present disclosure. In all the accompanying drawings, like reference numerals denote like parts. In the drawings:

FIG. 10B is a schematic diagram of optical paths, polarization state transformation, and optical isolation of first crystal forward o light and third crystal backward e light according to the first embodiment of the present disclosure;

FIG. 10C is a schematic diagram of optical paths, polarization state transformation, and optical isolation of first crystal forward e light and third crystal backward o light according to the first embodiment of the present disclosure;

DETAILED DESCRIPTION

Some exemplary embodiments of the present disclosure are hereinafter described in detail with reference to the accompanying drawings. Although the accompanying drawings illustrate the exemplary embodiments of the present disclosure, it shall be understood that the present disclosure may be practiced in various manners, and the present disclosure shall not be limited by the embodiments illustrated herein.

Figure 1:
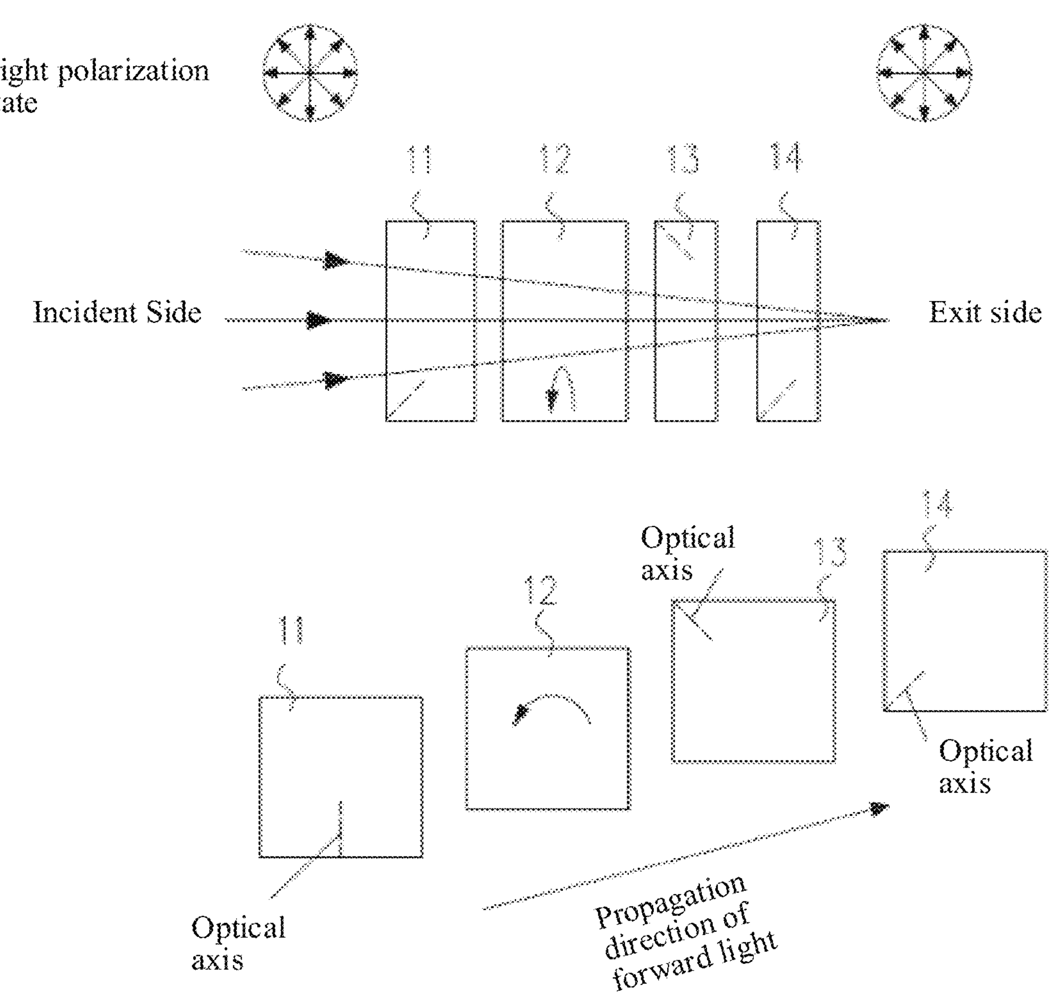
FIG. 1 is a schematic diagram of an application scenario of a polarization independence and convergent beam according to an embodiment of the present disclosure.

The embodiments of the present disclosure are mainly applicable to a scenario of implementing optical isolation for a polarization independence and non-collimating beam. The non-collimating beam includes a convergent beam and a divergent beam. FIG. 1 is a schematic diagram of an application scenario of a polarization independence and convergent beam according to an embodiment of the present disclosure. The polarization independent optical isolator core for non-collimating beam in FIG. 1 includes: a birefringent crystal 11, a Faraday rotator 12, a birefringent crystal 13, and a birefringent crystal 14 that are successively arranged along a propagating direction of forward light (a forward optical path). The forward light in FIG. 1 is a convergent beam with a large light spot at an incident side and a small light spot at an exit side. Nevertheless, the forward light may also be a divergent beam with a small light spot at the incident side and a large light spot at the exit side. Polarization states of the forward light at the incident side and the exit side are a random polarization state, with an extremely high forward light coupling efficiency and an extremely low polarization dependent loss (PDL).

Figure 2:
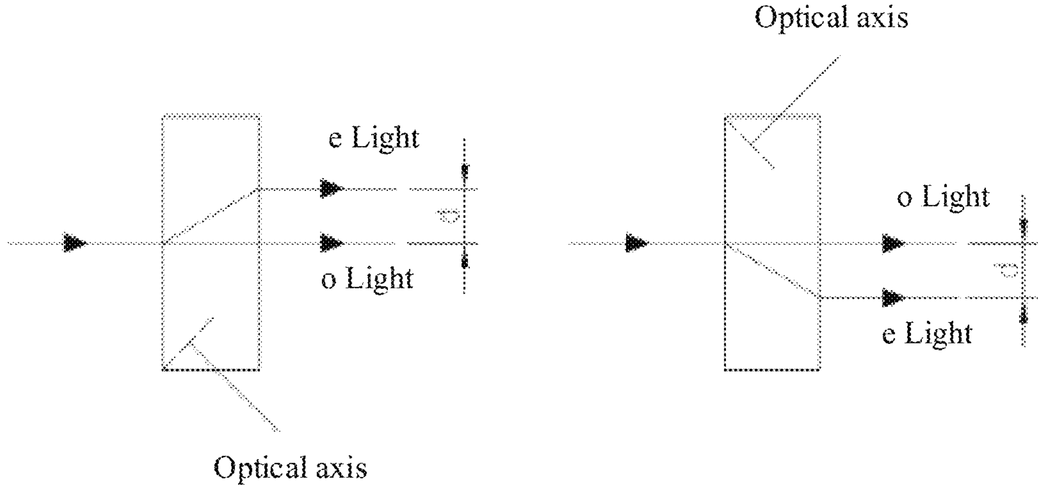
FIG. 2 is a schematic diagram of a crystal birefringence phenomenon and a light displacement according to an embodiment of the present disclosure.

FIG. 2 is a schematic diagram of a crystal birefringence phenomenon and a light displacement according to an embodiment of the present disclosure. Using a scenario where a light is normally incident on a birefringent crystal as an example, the light is separated into o light and e light in response to entering the birefringent crystal. The o light follows the refraction law, and is not subjected to any angle change but enters and exits from the birefringent crystal along the same direction of the incident light. However, the e light does not follow the refraction law, and is subjected to optical path deviations in the birefringent crystal and exists from the birefringent crystal upon forming a specific displacement. In this case, a relative walk-off between the o light and the e light is d or −d.

A positive birefringent crystal and a negative birefringent crystal have opposite e light deflection directions. For brevity of description, hereinafter a positive birefringent crystal is used as an example for illustration. An included angle θ between an optical axis of the birefringent crystal and a normal of an incident surface is a walk-off angle, wherein a value of θ satisfies: $0° < \theta < 90°$ or $-90° < \theta < 0°$, and the walk-off angle is configured to control a relative walk-off between o light and e light in response to the light traveling through the birefringent crystal. In the case that $0° < \theta < 90°$, as illustrated in the left part in FIG. 2, the e light is deflected upwards to form a displacement d; and in the case that $-90° < \theta < 0°$, as illustrated in the right part in FIG. 2, the e light is deflected downwards to form a displacement −d. Therefore, by changing the angle θ, the relative walk-off between the o light and the e light at the exit side is changed.

Figure 3:
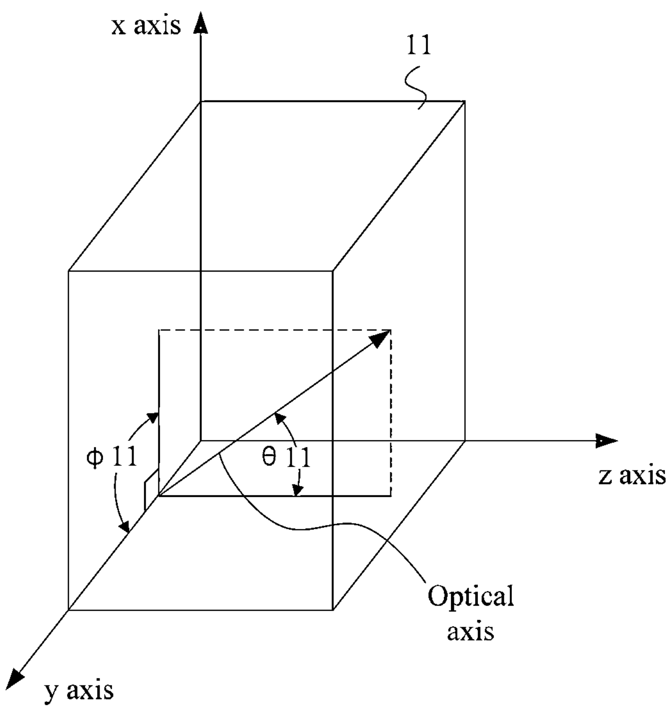
FIG. 3 is a schematic diagram of an optical axis direction of a birefringent crystal 11 according to an embodiment of the present disclosure.

FIG. 3 is a schematic diagram of an optical axis direction of a birefringent crystal 11 according to an embodiment of the present disclosure. The birefringent crystal 11 is a parallel plate structure. Using an incident point as an origin point, a Cartesian coordinate system may be formed on an incident surface of the birefringent crystal 11. In FIG. 3, the xy plane represents the incident surface, and the z axis represents a normal of the incident surface and the propagating direction of the forward light. In FIG. 3, the optical axis is in the xz plane, and a walk-off angle formed between the optical axis and the z axis is θ11. In this embodiment, a projection angle of the optical axis of the birefringent crystal 11 on the incident surface of the forward light is φ11, with a value satisfying 0°φ11≤360θ. In FIG. 3, φ1=90θ. It should be noted that in this embodiment, the projection angle of the optical axis on the incident surface of the forward light is an angle at which the y axis is counterclockwise rotated along the propagating direction of the forward light to a projection of the optical axis on the incident surface (the xy plane).

Figure 4:
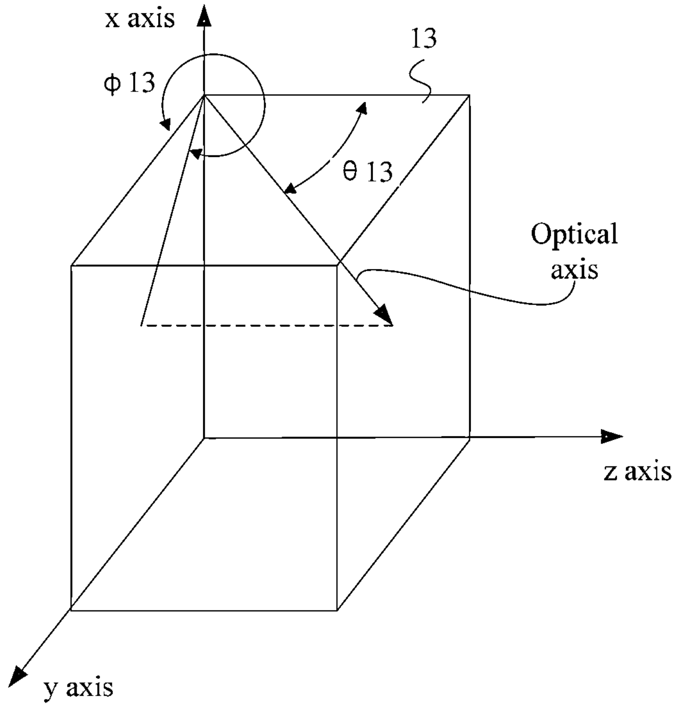
FIG. 4 is a schematic diagram of an optical axis direction of a birefringent crystal 13 according to an embodiment of the present disclosure.

FIG. 4 is a schematic diagram of an optical axis direction of a birefringent crystal 13 according to an embodiment of the present disclosure. The birefringent crystal 13 is a parallel plate structure. Likewise, using an incident point as an origin point, a Cartesian coordinate system may be formed on an incident surface of the birefringent crystal 13. In FIG. 4, the xy plane represents the incident surface, and the z axis represents a normal of the incident surface and the propagating direction of the forward light. A walk-off angle formed between the optical axis and the z axis is θ13. In this embodiment, a projection angle of the optical axis of the birefringent crystal 13 on the incident surface of the forward light is φ13, with a value satisfying 0°≤φ13 360°. In FIG. 4, φ13=315°.

Figure 5:
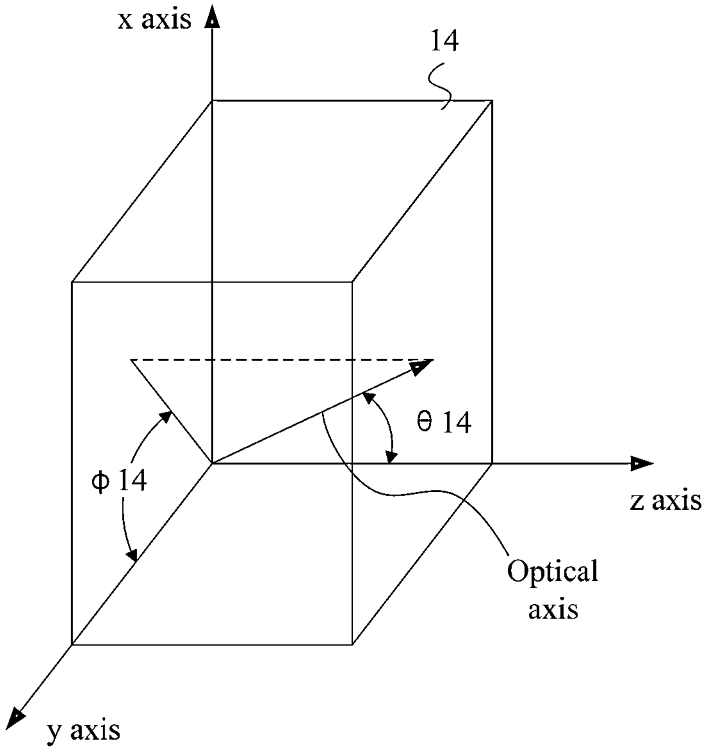
FIG. 5 is a schematic diagram of an optical axis direction of a birefringent crystal 14 according to an embodiment of the present disclosure.

FIG. 5 is a schematic diagram of an optical axis direction of a birefringent crystal 14 according to an embodiment of the present disclosure. The birefringent crystal 14 is a parallel plate structure. Likewise, using an incident point as an origin point, a Cartesian coordinate system may be formed on an incident surface of the birefringent crystal 14. In FIG. 5, the xy plane represents the incident surface, and the z axis represents a normal of the incident surface and the propagating direction of the forward light. A walk-off angle formed between the optical axis and the z axis is θ14. In this embodiment, a projection angle of the optical axis of the birefringent crystal 14 on the incident surface of the forward light is φ14, with a value satisfying 0°≤φ14≤360°. In FIG. 5, φ14=45°.

Figure 6:
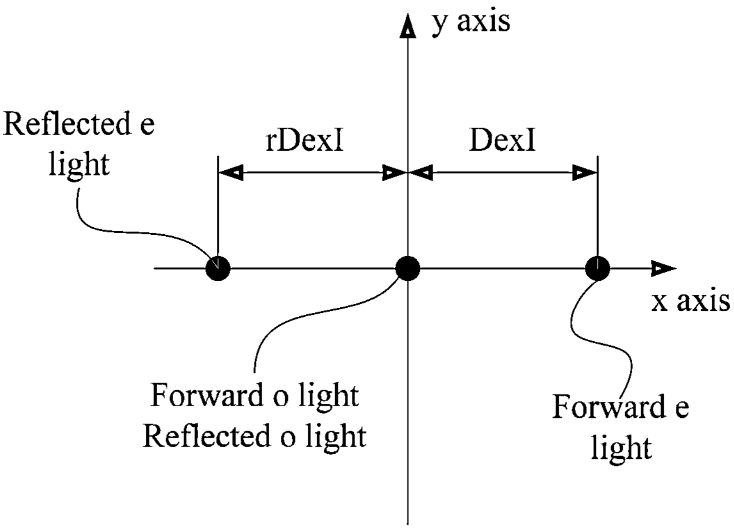
FIG. 6 is a schematic diagram of a light displacement of the birefringent crystal 11 according to an embodiment of the present disclosure.

FIG. 6 is a schematic diagram of a light displacement of the birefringent crystal 11 according to an embodiment of the present disclosure. For ease of description, using the incident point of the forward light as the origin point, a Cartesian coordinate system is formed on the incident surface of each of the birefringent crystals. The displacement in the embodiments of the present disclosure refers to a distance of an exit point with respect to the incident point in the x axis direction and the y axis direction of the Cartesian coordinate system in the case that the light travels through the birefringent crystal. Regardless of the displacement of incident of forward light or backward light, reference may always be made to the Cartesian coordinate system of the forward light. In this embodiment, an optical axis angle of the birefringent crystal 11 is φ11=90°. Using a scenario where the forward light is normally incident on the birefringent crystal 11 as an example, a forward o light component follows the refraction law, and is not subjected to any displacement in the xy plane but exits from the birefringent crystal 11 at the origin point of the Cartesian coordinate system, i.e., the incident point of the forward light, that is, DoxI=0 and DoyI=0, wherein DoxI represents a displacement of the forward o light along the x axis direction in the birefringent crystal 11, and DoyI represents a displacement of the forward o light along the y axis direction in the birefringent crystal 11; and the forward e light component does not follow the refraction law, with a displacement DexI along the x axis direction, and with no displacement along the y axis direction, that is, DeyI=0. With respect to the backward light backward entering the birefringent crystal, a displacement of the backward light is opposite to that of the forward light. Using a scenario where the backward light is normally incident on the birefringent crystal 11 as an example, the coordinate of an incident point of the backward light is the origin point of the Cartesian coordinate system, and the backward o light component is not subjected to any displacement in the xy plane, that is, rDoxI=0 and rDoyI=0, wherein rDoxI represents a displacement of the backward o light along the x axis direction in the birefringent crystal 11, and rDoyI represents a displacement of the backward o light along the y axis direction in the birefringent crystal 11; and a displacement of the backward e light component along the x axis direction is rDexI, and the backward e light component is not subjected to any displacement along the y axis direction, that is, rDeyI=0. rDexI=−DexI. The displacement of the e light may be adjusted by reasonably defining the walk-off angle θ, the material, and/or the thickness of the birefringent crystal 11. In the embodiments hereinafter, the displacement of the normal-incident forward e light in the birefringent crystal 11 is defined as DexI=2a and DeyI=0; and correspondingly, the displacement of the normal-incident backward e light in the birefringent crystal 11 is rDexI=−2a and rDeyI=0. Nevertheless, in practice, the displacement may take other values, which is not limited herein.

Figure 7:
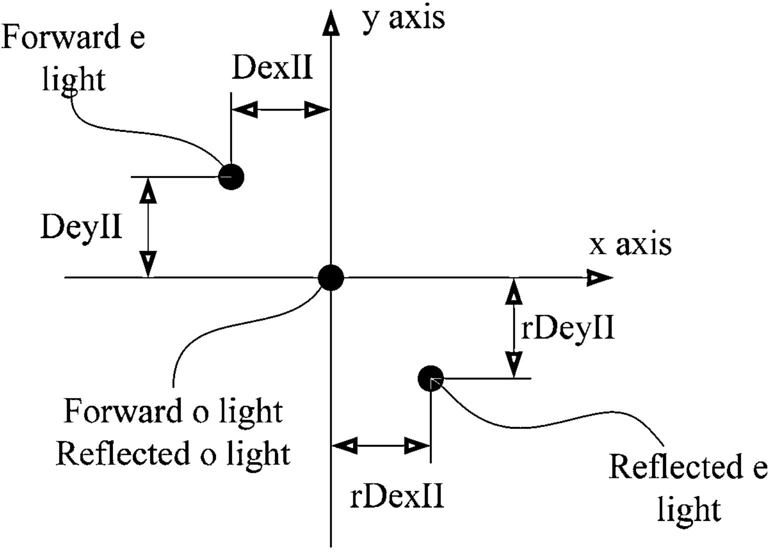
FIG. 7 is a schematic diagram of a light displacement of the birefringent crystal 13 according to an embodiment of the present disclosure.

FIG. 7 is a schematic diagram of a light displacement of the birefringent crystal 13 according to an embodiment of the present disclosure. In this embodiment, an optical axis angle of the birefringent crystal 13 is φ13=315°. Using a scenario where the forward light is normally incident on the birefringent crystal 13 as an example, a forward o light component follows the refraction law, and is not subjected to any displacement in the xy plane but exits from the birefringent crystal 13 at the origin point of the Cartesian coordinate system, i.e., the incident point of the forward light, that is, DoxII=0 and DoyII=0, wherein DoxII represents a displacement of the forward o light along the x axis direction in the birefringent crystal 13, and DoyII represents a displacement of the forward o light along the y axis direction in the birefringent crystal 13; and the forward e light component does not follow the refraction law, with a displacement DexII along the x axis direction in the xy plane, and with a displacement DeyII along the y axis direction in the xy plane. With respect to the backward light backward entering the birefringent crystal, its displacement is opposite to that of the forward light. Using a scenario where the backward light is normally incident on the birefringent crystal 13 as an example, the coordinate of an incident point of the backward light is the origin point of the Cartesian coordinate system, and the backward o light component is not subjected to any displacement in the xy plane, that is, rDoxII=0 and rDoyII=0, wherein rDoxII represents a displacement of the backward o light along the x axis direction in the birefringent crystal 13, and rDoyII represents a displacement of the backward o light along the y axis direction in the birefringent crystal 13; and a displacement of the backward e light component along the x axis direction in the xy plane is rDexII, and a displacement of the backward e light component along the y axis direction in the xy plane is rDeyII. rDexII=−DexII and rDeyII=−DeyII. The displacement of the e light may be adjusted by reasonably defining the walk-off angle θ, the material, and/or the thickness of the birefringent crystal 13. In the embodiments hereinafter, the displacement of the normal-incident forward e light in the birefringent crystal 13 is defined as DexII=−a and DeyII=a; and correspondingly, the displacement of the normal-incident backward e light in the birefringent crystal 13 is rDexII=a and rDeyII=−a. In practice, the displacement may take other values, which is not limited herein.

Figure 8:
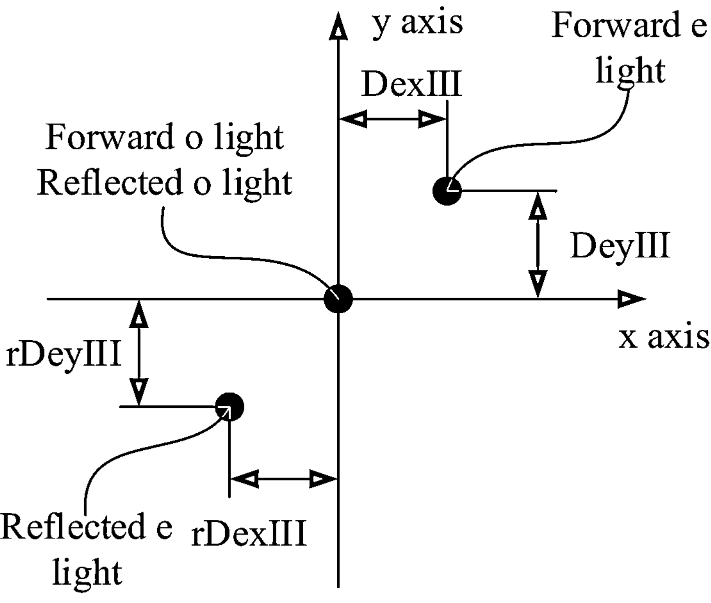
FIG. 8 is a schematic diagram of a light displacement of the birefringent crystal 14 according to an embodiment of the present disclosure.

FIG. 8 is a schematic diagram of a light displacement of the birefringent crystal 14 according to an embodiment of the present disclosure. In this embodiment, an optical axis angle of the birefringent crystal 14 is φ14=45θ. Using a scenario where the forward light is normally incident on the birefringent crystal 14 as an example, a forward o light component follows the refraction law, and is not subjected to any displacement in the xy plane but exits from the birefringent crystal 14 at the origin point of the Cartesian coordinate system, i.e., the incident point of the forward light, that is, DoxIII=0 and DoyIII=0, wherein DoxIII represents a displacement of the forward o light along the x axis direction in the birefringent crystal 14, and DoyIII represents a displacement of the forward o light along the y axis direction in the birefringent crystal 14; and the forward e light component does not follow the refraction law, with a displacement DexIII along the x axis direction in the xy plane, and with a displacement DeyIII along the y axis direction in the xy plane. With respect to the backward light backward entering the birefringent crystal, its displacement is opposite to that of the forward light. Using a scenario where the backward light is normally incident on the birefringent crystal 14 as an example, the coordinate of an incident point of the backward light are the origin point of the Cartesian coordinate system, and the backward o light component is not subjected to any displacement in the xy plane, that is, rDoxIII=0 and rDoyIII=0, wherein rDoxIII represents a displacement of the backward o light along the x axis direction in the birefringent crystal 14, and rDoyIII represents a displacement of the backward o light along the y axis direction in the birefringent crystal 14; and a displacement of the backward e light component along the x axis direction in the xy plane is rDexIII, and a displacement of the backward e light component along the y axis direction in the xy plane is rDeyIII. rDexIII=−DexIII and rDeyIII=−DeyIII. The displacement of the e light may be adjusted by reasonably defining the walk-off angle θ, the material, and/or the thickness of the birefringent crystal 14. In the embodiments hereinafter, the displacement of the normal-incident forward e light in the birefringent crystal 14 is defined as DexIII=a and DeyIII=a; and correspondingly, the displacement of the normal-incident backward e light in the birefringent crystal 14 is rDexIII=−a and rDeyIII=−a. In practice, the displacement may take other values, which is not limited herein.

Figure 9:
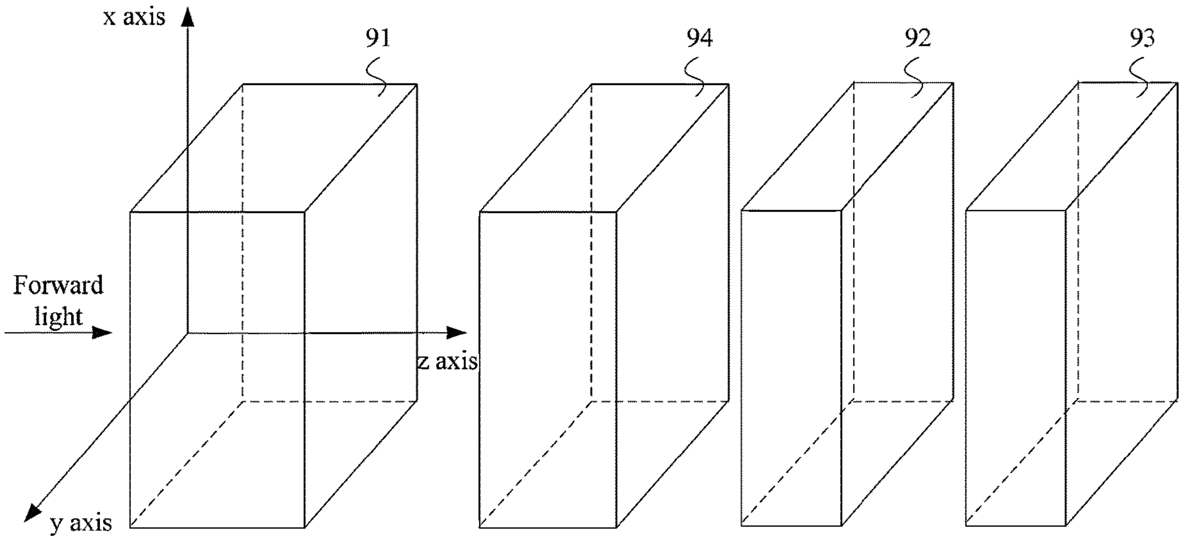
FIG. 9 is a schematic structural diagram of an optical isolator core according to an embodiment of the present disclosure.

FIG. 9 is a schematic structural diagram of an optical isolator core according to an embodiment of the present disclosure. The optical isolator core includes: a first birefringent crystal 91, a Faraday rotator 94, a second birefringent crystal 92, and a third birefringent crystal 93 that are successively arranged along a forward optical path. The first birefringent crystal 91, the Faraday rotator 94, the second birefringent crystal 92, and the third birefringent crystal 93 are all parallel plate structures.

In the case that forward light is incident on the first birefringent crystal 91, the first birefringent crystal 91 is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the Faraday rotator 94 is configured to respectively rotate, at a rotation angle α, the polarization directions of the first crystal forward o light and the first crystal forward e light to form rotated first crystal forward o light and rotated first crystal forward e light; the second birefringent crystal 92 is configured to cause the rotated first crystal forward o light and the rotated first crystal forward e light to respectively generate a second displacement of the first crystal forward o light and a second displacement of the first crystal forward e light; and the third birefringent crystal 93 is configured to cause the first crystal forward o light and the first crystal forward e light that travel through the second birefringent crystal to respectively generate a third displacement of the first crystal forward o light and a third displacement of the first crystal forward e light.

A sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal 93.

In the case that backward light entering backward along the forward optical path is incident on the third birefringent crystal 93, the third birefringent crystal 93 is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the second birefringent crystal 92 is configured to cause the third crystal backward o light and the third crystal backward e light that travel through the third birefringent crystal 93 to respectively generate a second displacement of the third crystal backward o light and a second displacement of the third crystal backward e light; the Faraday rotator 94 is configured to respectively rotate, at the rotation angle α and along the same direction of the forward light, the polarization directions of the third crystal backward o light and the third crystal backward e light that travel through the second birefringent crystal 92 to form rotated third crystal backward o light and rotated third crystal backward e light; and the first birefringent crystal 91 is configured to cause the rotated third crystal backward o light and the rotated third crystal backward e light to respectively generate a first displacement of the third crystal backward o light and a first displacement of the third crystal backward e light.

A sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

It should be noted that the first crystal forward o light and the first crystal forward e light refer to the forward o light and the forward e light separated in the first birefringent crystal 91 and are o light and e light with respect to the first birefringent crystal 91, and in other crystals, the light may be propagated in an o light polarization state or in an e light polarization state; and the third crystal backward o light and the third crystal backward e light refer to the backward o light and the backward e light separated in the third birefringent crystal 93 and are o light and e light with respect to the third birefringent crystal 93, and the light may be propagated in the o light polarization state or in the e light polarization state in other crystals.

In an embodiment, a projection angle of an optical axis of the first birefringent crystal 91 on an incident surface of the forward light is φ1, a projection angle of an optical axis of the second birefringent crystal 92 on the incident surface of the forward light is φ2, and a projection angle of an optical axis of the third birefringent crystal 93 on an incident surface of the forward light is φ3.

A value of φ1 satisfies: 0°φ1≤360°, a relationship between φ2 and φ1 satisfies: |φ2−φ1|=α, 90°+α, 180°+α or 270°+α, and a relationship between φ3 and φ2 satisfies: |φ3−φ2|=90θ±20θ or 270°±20°. A preferred value of |φ3−φ2| is 90° or 270°. That is, a projection line of the optical axis of the third birefringent crystal 93 on the incident surface of the forward light is angular-orthogonal to a projection line of the optical axis of the second birefringent crystal 92 on the incident surface of the forward light. However, in practice, a value within 90°±20° or 270°±20° may be taken.

Likewise, using an incident point of the forward light on the first birefringent crystal 91 as an origin point, a Cartesian coordinate system with x and y axes may be formed on an incident surface of the first birefringent crystal 91. The projection angle of the optical axis on the incident surface of the forward light is an angle at which the y axis is counter-clockwise rotated along the propagating direction of the forward light to a projection of the optical axis on the incident surface (the xy plane).

A preferred value of the rotation angle $\alpha$ of the Faraday rotator 94 is 45 degrees, and in practice, another angle approximate to 45 degrees may also be taken. In response to the polarization direction of the forward light being rotated by the Faraday rotator 94, the forward light is propagated as the o light or the e light in the next birefringent crystals; and in response to the polarization direction of the backward light being rotated once more along the same direction of the forward light by the Faraday rotator 94, the forward light and the backward light are subjected to an o/e light polarization state exchange in the first birefringent crystal 91. The backward light is subjected to a displacement and thus deviates from the forward optical path, such that a minimum insertion loss (IL), a minimum polarization dependent loss (PDL) of the forward light and a maximum isolation (ISO) of the backward light are simultaneously achieved.

An included angle $\theta$ between an optical axis of the birefringent crystal and a normal of an incident surface may be referred to as a walk-off angle, wherein a value of $\theta$ satisfies: $0° < \theta < 90°$ or $-90° < \theta < 0°$, and the walk-off angle is configured to control a relative walk-off between an exiting o light and an exiting e light in response to the light traveling through the birefringent crystal.

As described above, the first displacement of the first crystal forward o light includes a displacement Dox1 along the x axis and a displacement Doy1 along the y axis of the exit point with respect to the incident point in the case that the light travels through the first birefringent crystal 91, and the first displacement of the first crystal forward e light includes a displacement Dex1 along the x axis and a displacement Dey1 along the y axis of the exit point with respect to the incident point in the case that the light travels through the first birefringent crystal 91. The second displacement of the first crystal forward o light includes a displacement Dox2 along the x axis and a displacement Doy2 along the y axis of the exit point with respect to the incident point in the case that the light travels through the second birefringent crystal 92, and the second displacement of the first crystal forward e light includes a displacement Dex2 along the x axis and a displacement Dey2 along the y axis of the exit point with respect to the incident point in the case that the light travels through the second birefringent crystal 92. The third displacement of the first crystal forward o light includes a displacement Dox3 along the x axis and a displacement Doy3 along the y axis of the exit point with respect to the incident point in the case that the light travels through the third birefringent crystal 93, and the third displacement of the first crystal forward e light includes a displacement Dex3 along the x axis and a displacement Dey3 along the y axis of the exit point with respect to the incident point in the case that the light travels through the third birefringent crystal 93.

In the case that the first crystal forward o light exits from the third birefringent crystal 93, in the Cartesian coordinate system formed on the incident surface of the forward light of the first birefringent crystal 91, the x-axis coordinate of the exit point is Dox, and the y-axis coordinate of the exit point is Doy. In this case, Dox=Dox1+Dox2+Dox3, and Doy=Doy1+Doy2+Doy3. Likewise, in the case that the first crystal forward e light exits from the third birefringent crystal 93, in the Cartesian coordinate system, the x-axis coordinate of the exit point is Dex, and the y-axis coordinate of the exit point is Dey. In this case, Dex=Dex1+Dex2+Dex3, and Dey=Dey1+Dey2+Dey3. Accordingly, Dox=Dex, and Doy=Dey. In this case, the first crystal forward o light and the first crystal forward e light are coincident with each other in response to exiting from the third birefringent crystal 93 (a final exit point in response to exiting from the optical isolator core). That is, the displacements of the first crystal forward o light and the first crystal forward e light in the crystals may be adjusted by reasonably defining the walk-off angle $\theta$, the material, and/or the thickness of the birefringent crystals; and by reasonably defining the relations of the projection angles $\varphi$ of the optical axes of the crystals, and the rotation angle $\alpha$ of the Faraday rotator, the first crystal forward o light and the first crystal forward e light have the same coordinate position in the Cartesian coordinate system in response to exiting from the optical isolator core, and are coincident with each other at the final exit point.

Likewise, the third displacement of the third crystal backward o light includes a displacement rDox3 along the x axis and a displacement rDoy3 along the y axis of the exit point with respect to the incident point in the case that the light travels through the third birefringent crystal 93, and the third displacement of the third crystal backward e light includes a displacement rDex3 along the x axis and a displacement rDey3 along the y axis of the exit point with respect to the incident point in the case that the light travels through the third birefringent crystal 93. The second displacement of the third crystal backward o light includes a displacement rDox2 along the x axis and a displacement rDoy2 along the y axis of the exit point with respect to the incident point in the case that the light travels through the second birefringent crystal 92, and the second displacement of the third crystal backward e light includes a displacement rDex2 along the x axis and a displacement rDey2 along the y axis of the exit point with respect to the incident point in the case that the light travels through the second birefringent crystal 92. The first displacement of the third crystal backward o light includes a displacement rDox1 along the x axis and a displacement rDoy1 along the y axis of the exit point with respect to the incident point in the case that the light travels through the first birefringent crystal 91, and the first displacement of the third crystal backward e light includes a displacement rDex1 along the x axis and a displacement rDey1 along the y axis of the exit point with respect to the incident point in the case that the light travels through the first birefringent crystal 91.

In the case that the third crystal backward o light exits from the first birefringent crystal 91, in the Cartesian coordinate system formed on the incident surface of the forward light of the first birefringent crystal 91, the x-axis coordinate of the exit point is rDox, and the y-axis coordinate of the exit point is rDoy. In this case, rDox=rDox1+rDox2+rDox3+Dox, and rDoy=rDoy1+rDoy2+rDoy3+Doy. Likewise, in the case that the third crystal backward e light exits from the first birefringent crystal 91, in the Cartesian coordinate system, the x-axis coordinate of the exit point is rDex, and the y-axis coordinate of the exit point is rDey. In this case, rDex=rDex1+rDex2+rDex3+Dex, and rDey=rDey1+rDey2+rDey3+Dey. A displacement of the coordination position of the exit point of the third crystal backward o light in the first birefringent crystal 91 with respect to the incident point of the forward light in the first birefringent crystal 91

(that is, the origin point of the Cartesian coordinate system) causes the backward o light to deviate from the forward optical path, and a displacement of the coordinate position of the exit point of the third crystal backward e light in the first birefringent crystal 91 with respect to the incident point of the forward light in the first birefringent crystal 91 causes the backward e light to deviate from the forward optical path.

Depending on different polarization states of the light in the three birefringent crystals, the optical isolator core according to this embodiment may involve the following two examples.

In a first example, the polarization states of the first crystal forward o light in the three birefringent crystals are successively o-o-e, and the polarization states of the first crystal forward e light in the three birefringent crystals are successively e-e-o.

Specifically, the second birefringent crystal 92 is further configured to cause the first crystal forward o light rotated by the Faraday rotator 94 to be still propagated in the o light polarization state when traveling through the second birefringent crystal 92, and cause the first crystal forward e light rotated by the Faraday rotator 94 to be still propagated in the e light polarization state when traveling through the second birefringent crystal 92.

The third birefringent crystal 93 is further configured to cause the first crystal forward o light traveling through the second birefringent crystal 92 to be propagated in the e light polarization state when traveling through the third birefringent crystal 93, and cause the first crystal forward e light traveling through the second birefringent crystal 92 to be propagated in the o light polarization state when traveling through the third birefringent crystal 93.

Specifically, the first birefringent crystal 91 may be the birefringent crystal 11, the second birefringent crystal 92 may be the birefringent crystal 13, and the third birefringent crystal 93 may be the birefringent crystal 14. As described above, the projection angles of the optical axes of these three birefringent crystals on the incident surface of the forward light are respectively $\varphi11=90°$, $\varphi13=315°$, and $\varphi14=45°$. The Faraday rotator 94 may be the Faraday rotator 12. A rotatory direction of the Faraday rotator 12 is reasonably defined. In this example, the light is counterclockwise rotated at a rotation angle $\alpha=45°$ along the propagating direction of the forward light. In this case, $|\phi2-\phi1|=|\varphi13-\varphi11|=|315°-90°=180°+\alpha$, and $|\varphi3-\varphi2|=|\varphi14-\varphi13|=45°-315°=270°$, and the relation requirements of $\varphi1$, $\varphi2$ and $\varphi3$ are satisfied.

Figure 10A:
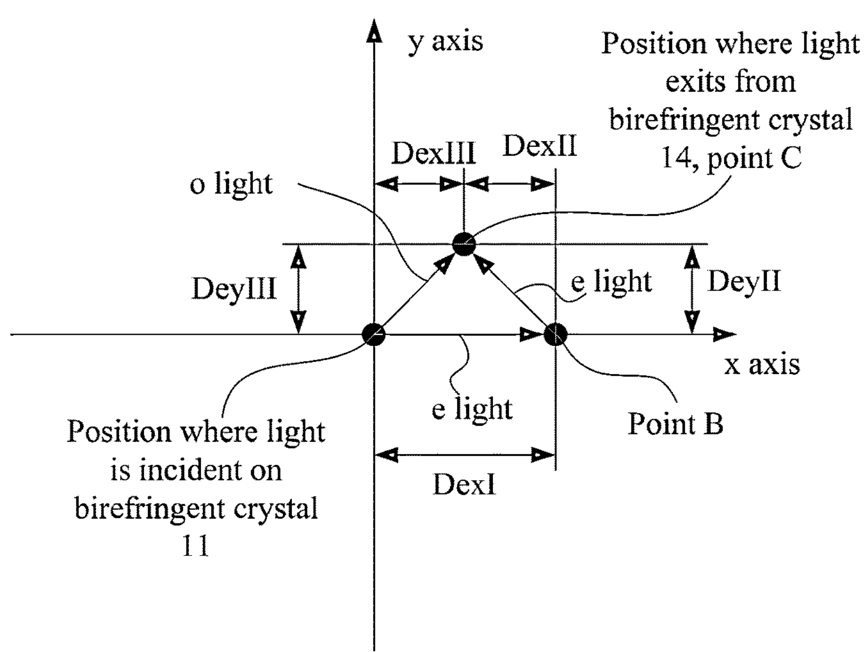
FIG. 10A is a schematic diagram of a sum of displacements of forward light according to a first embodiment of the present disclosure.

FIG. 10A is a schematic diagram of a sum of displacements of forward light according to a first embodiment of the present disclosure. Using a scenario where the forward light is normally incident on the birefringent crystal 11 at a point A as an example, in response to entering the birefringent crystal 11, the forward light is separated into the first crystal forward o light and the first crystal forward e light. The first crystal forward o light is propagated in the birefringent crystal 11 in the o light polarization state, with no displacement and the exit point at the point A. In response to first crystal forward o light entering the 45-degree faraday rotator 12, the polarization direction of the first crystal forward o light is counterclockwise rotated at 45 degrees along the propagating direction of the forward light. In this case, the first crystal forward o light is still propagated in the o light polarization state in the birefringent crystal 13, with no displacement and the exit point still at the point A. Afterwards, the first crystal forward o light enters the birefringent crystal 14. Since $|\varphi14-\varphi13|=45°-315°=270°$, the first crystal forward o light is propagated in the e light polarization state in the birefringent crystal 14 with a displacement. In this case, the exit point of the first crystal forward o light in the birefringent crystal 14 is subjected to a specific displacement, and the final exit point is at a point C. According to the coordinate formulas $Dox=Dox1+Dox2+Dox3$ and $Doy=Doy1+Doy2+Doy3$ of the final exit point of the first crystal forward o light in response to exiting from the optical isolator core, the displacements of the forward o light in the birefringent crystal 11 and the birefringent crystal 13, and the displacement of the forward e light in the birefringent crystal 14 are introduced into the formulas to obtain the following formulas: $Dox=DoxI+DoxII+DexIII=0+0+\alpha=a$, and $Doy=DoyI+DoyII+DeyIII=0+0+\alpha=a$.

The first crystal forward e light is propagated in the birefringent crystal 11 in the e light polarization state, with a displacement and the exit point at a point B. In response to the first crystal forward e light entering the 45-degree faraday rotator 12, polarization direction of the first crystal forward e light is counterclockwise rotated at 45 degrees along the propagating direction of the forward light. In this case, the first crystal forward e light is still propagated in the e light polarization state in the birefringent crystal 13, with a displacement and the exit point at the point C. Afterwards, the first crystal forward e light enters the birefringent crystal 14, and travels through the birefringent crystal 14 in the o light polarization state, with no displacement and the final exit point at the point C. According to the coordinate formulas $Dex=Dex1+Dex2+Dex3$ and $Dey=Dey1+Dey2+Dey3$ of the final exit point of the first crystal forward e light, the displacements of the forward e light in the birefringent crystal 11 and the birefringent crystal 13, and the displacement of the forward o light in the birefringent crystal 14 are introduced into the formulas to obtain the following formulas: $Dex=DexI+DexII+DoxIII=2a+(-a)+0=a$, and $Dey=DeyI+DeyII+DoyIII=0+\alpha+0=a$.

Therefore, $Dex=Dox=a$ and $Dey=Doy=a$, that is, the first crystal forward o light and the first crystal forward e light have the same coordinate position, that is, the C point, in response to exiting from the optical isolator core, and the exit points of the first crystal forward o light and the first crystal forward e light are coincident with each other. Therefore, a maximum coupling efficiency and a minimum polarization dependent loss (PDL) are achieved for the forward light.

FIG. 10B is a schematic diagram of optical paths, polarization state transformation, and optical isolation of first crystal forward o light and third crystal backward e light according to the first embodiment of the present disclosure. Description is given hereinafter using a scenario where the forward light is normally incident on the birefringent crystal 11 as an example. As illustrated in FIG. 10A, the first crystal forward o light exits from the optical isolator core at the point C ($Dox=a$ and $Doy=a$).

In the case that the third crystal backward e light is backward propagated along the forward optical path, the third crystal backward e light is propagated in the e light polarization state in the birefringent crystal 14 with a displacement, and is propagated in the o light polarization state in the birefringent crystal 13 with no displacement. In the birefringent crystal 13 and the birefringent crystal 14, the optical path of the backward e light is completely coincident with the optical path of the forward o light. Subsequently, in response to the third crystal backward e light entering the 45-degree faraday rotator 12, the polarization direction of the third crystal backward e light is counterclockwise rotated at 45 degrees once more along a direction the same as that of the forward light. In this case, with respect to the polarization direction of the first crystal forward o light, the polarization direction of the third crystal backward e light is accumulatively rotated at 90 degrees. The backward light and the forward light are subjected to an o/e light polarization state exchange in the birefringent crystal 11. The third crystal backward e light travels through the birefringent crystal 11 in the e light polarization state with a displacement. Finally, in response to the third crystal backward e light exiting from the birefringent crystal 11, the exit point of the third crystal backward e light deviates with respect to the incident point of the first crystal forward o light, and the third crystal backward e light fails to be coupled into the forward optical path. In this way, the backward light is isolated. According to the coordinate formulas rDex=rDex1+rDex2+rDex3+Dex and rDey=rDey1+rDey2+rDey3+Dey of the final exit point of the third crystal backward e light in response to exiting from the optical isolator core, the displacements of the backward e light in the birefringent crystal 11 and the birefringent crystal 14 and the displacement of the backward o light in the birefringent crystal 13 are introduced into the formulas to obtain the following formulas: rDex=rDexI+rDoxII+rDexIII+Dox=−2a+0+(−a)+α=−2a, and rDey=rDeyI+rDoyII+rDeyIII+Doy=0+0+(−a)+α=0. That is, in response to exiting from the optical isolator core, the third crystal backward e light has a displacement of rDex=−2a and rDey=0 with respect to the incident point of the first crystal forward o light.

FIG. 10C is a schematic diagram of optical paths, polarization state transformation, and optical isolation of first crystal forward e light and third crystal backward o light according to the first embodiment of the present disclosure. Description is given hereinafter using a scenario where the forward light is normally incident on the birefringent crystal 11 as an example. As illustrated in FIG. 10A, the first crystal forward e light exits from the optical isolator core at the point C (Dex=a and Dey=a).

In the case that the third crystal backward o light is backward propagated along the forward optical path, the third crystal backward o light is propagated in the o light polarization state in the birefringent crystal 14 with no displacement, and is propagated in the e light polarization state in the birefringent crystal 13 with a displacement. In the birefringent crystal 13 and the birefringent crystal 14, the optical path of the backward o light is completely coincident with the optical path of the forward e light. Subsequently, in response to the third crystal backward o light entering the 45-degree faraday rotator 12, the polarization direction of the third crystal backward o light is counterclockwise rotated at 45 degrees once more along a direction the same as that of the forward light. In this case, with respect to the polarization direction of the first crystal forward e light, the third crystal backward o light is accumulatively rotated at 90 degrees. The backward light and the forward light are subjected to an o/e light polarization state exchange in the birefringent crystal 11. The third crystal backward o light is propagated in the o light polarization state in the birefringent crystal 11 with no displacement. Finally, in response to the third crystal backward o light exiting from the birefringent crystal 11, the exit point of the third crystal backward o light deviates with respect to the incident point of the first crystal forward e light, and the third crystal backward o light fails to be coupled into the forward optical path. In this way, the backward light is isolated. According to the coordinate formulas rDox=rDox1+rDox2+rDox3+Dox and rDoy=rDoy1+rDoy2+rDoy3+Doy of the final exit point of the third crystal backward o light, the displacements of the backward o light in the birefringent crystal 11 and the birefringent crystal 14 and the displacement of the backward e light in the birefringent crystal 13 are introduced into the formulas to obtain the following formulas: rDox=rDoxI+rDexII+rDoxIII+Dox=0+α+0+α=2a, and rDoy=rDoyI+rDeyII+rDoyIII+Doy=0+(−a)+0+α=0. That is, in response to exiting from the optical isolator core, the third crystal backward o light has a displacement of rDox=2a and rDoy=0 with respect to the incident point of the first crystal forward e light.

With reference to FIG. 10B and FIG. 10C, in response to exiting from the optical isolator core, the third crystal backward o light and the third crystal backward e light each deviate with respect to the incident point of the forward light in the optical isolator core, and both the third crystal backward o light and the third crystal backward e light fail to be coupled into the forward optical path. In this way, the polarization independent backward light is isolated.

In a second embodiment, the polarization states of the first crystal forward o light in the three birefringent crystals are successively o-e-o, and the polarization states of the first crystal forward e light in the three birefringent crystals are successively e-o-e.

Specifically, the second birefringent crystal 92 is further configured to cause the first crystal forward o light rotated by the Faraday rotator 94 to be propagated in the e light polarization state when traveling through the second birefringent crystal 92, and cause the first crystal forward e light rotated by the Faraday rotator 94 to be propagated in the o light polarization state when traveling through the second birefringent crystal 92.

The third birefringent crystal 93 is further configured to cause the first crystal forward o light traveling through the second birefringent crystal 92 to be still propagated in the o light polarization state when traveling through the third birefringent crystal 93, and cause the first crystal forward e light traveling through the second birefringent crystal 92 to be still propagated in the e light polarization state when traveling through the third birefringent crystal 93.

The second example is different from the first example mainly in that the forward light is propagated in the second birefringent crystal 92 and the third birefringent crystal 93 in a polarization state different from that in the first example. Accordingly, based on the first example, the rotation direction of the Faraday rotator 94 may be changed (that is, the rotation direction is changed from the counterclockwise direction along the propagating direction of the forward light to the clockwise direction along the propagating direction of the forward light), or the projection angles of the optical axes of the second birefringent crystal 92 and the third birefringent crystal 93 are exchanged.

In this embodiment, description is given using a scenario where the projection angles of the optical axes of the second birefringent crystal 92 and the third birefringent crystal 93 are exchanged as an example. Specifically, the first birefringent crystal 91 may be the birefringent crystal 11, the second birefringent crystal 92 may be the birefringent crystal 14, and the third birefringent crystal 93 may be the birefringent crystal 13. As described above, the projection angles of the optical axes of these three birefringent crystals on the incident surface of the forward light are respectively φ11=90°, φ13=315°, and φ14=45°. The Faraday rotator 94 may be the Faraday rotator 12. A rotatory direction of the Faraday rotator 12 is reasonably defined. In this example, the light is counterclockwise rotated at a rotation angle α=45° along the propagating direction of the forward light. In this case, |φ2−φ1=|φ14−φ11|=|45°−90°|=α, and |φ3−

$|\varphi 2| = |\varphi 13 - \varphi 14| = 315° - 45° = 270°$, and the relation requirements of $\varphi 1$, $\varphi 2$ and $\varphi 3$ are satisfied.

Figure 11A:
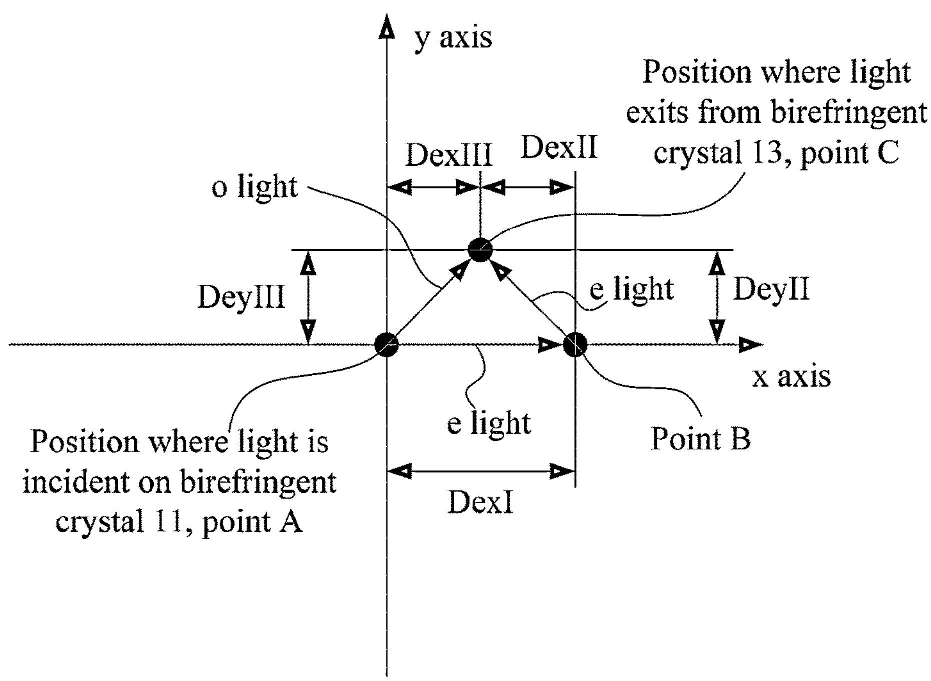
FIG. 11A is a schematic diagram of a sum of displacements of forward light according to a second embodiment of the present disclosure.

FIG. 11A is a schematic diagram of a sum of displacements of forward light according to a second embodiment of the present disclosure. Using a scenario where the forward light is normally incident on the birefringent crystal 11 at the point A as an example, in response to entering the birefringent crystal 11, the forward light is separated into the first crystal forward o light and the first crystal forward e light. The first crystal forward o light is propagated in the birefringent crystal 11 in the o light polarization state, with no displacement and the exit point at the point A. In response to the first crystal forward o light entering the 45-degree faraday rotator 12, the polarization direction of the first crystal forward o light is counterclockwise rotated at 45 degrees along the propagating direction of the forward light. In this case, the first crystal forward o light is propagated in the e light polarization state in the birefringent crystal 14, with a displacement and the exit point at the point C. Afterwards, the first crystal forward o light enters the birefringent crystal 13. Since $|\varphi 13 - \varphi 14| = |315° - 45°| = 270°$, the first crystal forward o light is propagated in the o light polarization state in the birefringent crystal 13 with no displacement. The exit point of the first crystal forward o light is finally subjected to a specific displacement exiting the birefringent crystal 13, and the first crystal forward o light finally exits at the point C. According to the coordinate formulas Dox=Dox1+Dox2+Dox3 and Doy=Doy1+Doy2+Doy3 of the final exit point of the first crystal forward o light in response to exiting from the optical isolator core, the displacements of the forward o light in the birefringent crystal 11 and the birefringent crystal 13, and the displacement of the forward e light in the birefringent crystal 14 are introduced into the formulas to obtain the following formulas: Dox=DoxI+DexIII+DoxII=0+$\alpha$+0=a, and Doy=DoyI+DeyIII+DoyII=0+$\alpha$+0=a.

The first crystal forward e light is propagated in the birefringent crystal 11 in the e light polarization state, with a displacement and the exit point at the point B. In response to the first crystal forward e light entering the 45-degree faraday rotator 12, the polarization direction of the first crystal forward e light is counterclockwise rotated at 45 degrees along the propagating direction of the forward light. In this case, the first crystal forward e light is propagated in the o light polarization state in the birefringent crystal 14, with no displacement and the exit point still at the point B. Afterwards, the first crystal forward e light enters the birefringent crystal 13, and travels through the birefringent crystal 13 in the e light polarization state with a displacement. In this case, the exit point of the first crystal forward e light in the optical isolator core is subjected to a specific displacement with respect to the incident point, and the final exit point is at the point C. According to the coordinate formulas Dex=Dex1+Dex2+Dex3 and Dey=Dey1+Dey2+Dey3 of the final exit point of the first crystal forward e light, the displacements of the forward e light in the birefringent crystal 11 and the birefringent crystal 13, and the displacement of the forward o light in the birefringent crystal 14 are introduced into the formulas to obtain the following formulas: Dex=DexI+DoxIII+DexII=2a+0+(−a)=a, and Dey=DeyI+DoyIII+DeyII=0+0+$\alpha$=a.

Therefore, Dex=Dox=a and Dey=Doy=a, that is, the first crystal forward o light and the first crystal forward e light have the same coordinate position, that is, the C point, in response to exiting from the optical isolator core, and the exit points of the first crystal forward o light and the first crystal forward e light are coincident with each other. Therefore, a maximum coupling efficiency and a minimum polarization dependent loss (PDL) are achieved for the forward light.

Figure 11B:
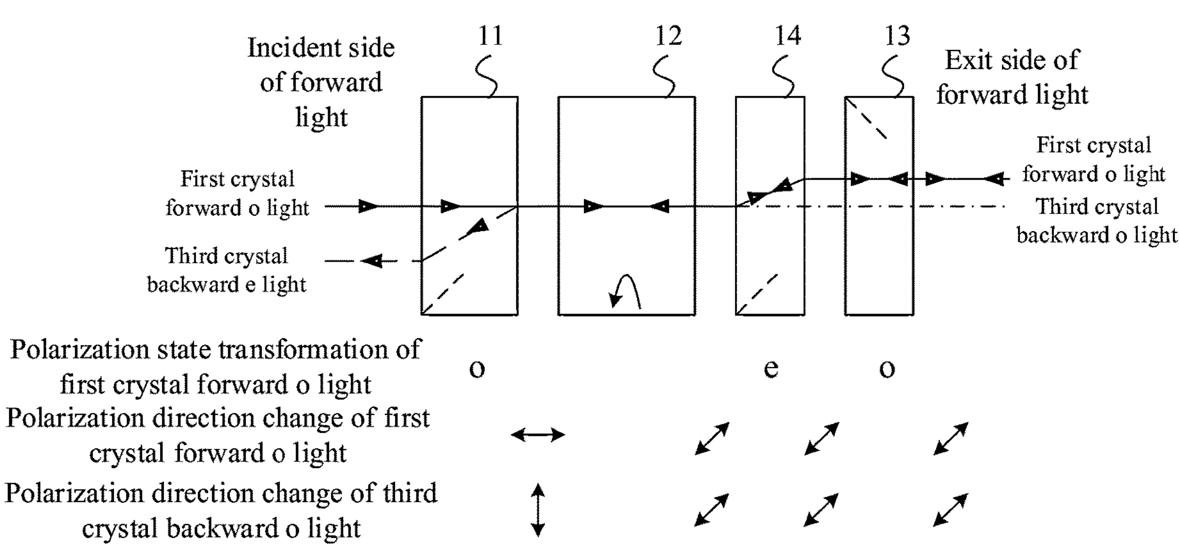
FIG. 11B is a schematic diagram of optical paths, polarization state transformation, and optical isolation of first crystal forward o light and third crystal backward o light according to the second embodiment of the present disclosure.

FIG. 11B is a schematic diagram of optical paths, polarization state transformation, and optical isolation of first crystal forward o light and third crystal backward o light according to the second embodiment of the present disclosure. Description is given hereinafter using a scenario where the forward light is normally incident on the birefringent crystal 11 as an example. As illustrated in FIG. 11A, the first crystal forward o light exits from the optical isolator core at the point C (Dox=a and Doy=a).

In the case that the third crystal backward o light is backward propagated along the forward optical path, the third crystal backward o light is propagated in the o light polarization state in the birefringent crystal 13 with no displacement, and is propagated in the e light polarization state in the birefringent crystal 14 with a displacement. In the birefringent crystal 13 and the birefringent crystal 14, the backward optical path of the third crystal backward o light is completely coincident with the forward optical path. Subsequently, in response to the third crystal backward o light entering the 45-degree faraday rotator 12, the polarization direction of the third crystal backward o light is counterclockwise rotated at 45 degrees once more along a direction the same as that of the forward light. In this case, with respect to the polarization direction of the first crystal forward o light, the polarization direction of the third crystal backward o light is accumulatively rotated at 90 degrees. The backward light and the forward light are subjected to an o/e light polarization state exchange in the birefringent crystal 11. The third crystal backward o light is propagated in the e light polarization state in the birefringent crystal 11 with a displacement. Finally, in response to the third crystal backward o light exiting from the birefringent crystal 11, the exit point of the third crystal backward o light deviates with respect to the incident point of the first crystal forward o light, and the third crystal backward o light fails to be coupled into the forward optical path. In this way, the backward light is isolated. According to the coordinate formulas rDox=rDox1+rDox2+rDox3+Dox and rDoy=rDoy1+rDoy2+rDoy3+Doy of the final exit point of the third crystal backward o light in response to exiting from the optical isolator core, the displacements of the backward e light in the birefringent crystal 11 and the birefringent crystal 14 and the displacement of the backward o light in the birefringent crystal 13 are introduced into the formulas to obtain the following formulas: rDox=rDexI+rDexIII+rDoxII+Dox=−2a+(−a)+0+$\alpha$=−2a, and rDoy=rDeyI+rDeyIII+rDoyII+Doy=0+(−a)+0+$\alpha$=0. That is, in response to exiting from the optical isolator core, the third crystal backward o light has a displacement of rDox=−2a and rDoy=0 with respect to the incident point of the first crystal forward o light.

Figure 11C:
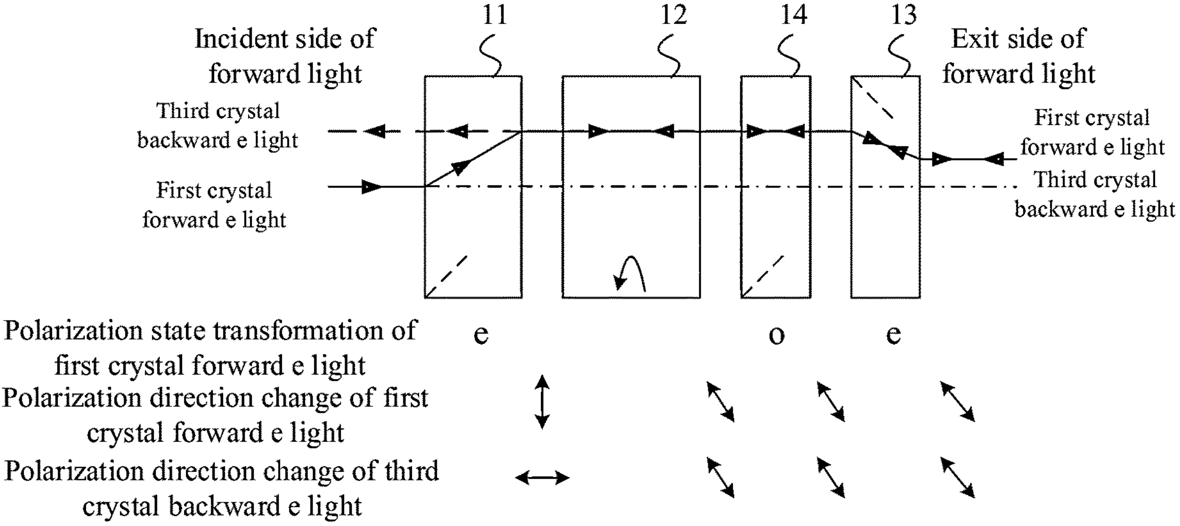
FIG. 11C is a schematic diagram of optical paths, polarization state transformation, and optical isolation of first crystal forward e light and third crystal backward e light according to the second embodiment of the present disclosure.

FIG. 11C is a schematic diagram of optical paths, polarization state transformation, and optical isolation of first crystal forward e light and third crystal backward e light according to the second embodiment of the present disclosure. Description is given hereinafter using a scenario where the forward light is normally incident on the birefringent crystal 11 as an example. As illustrated in FIG. 11A, the first crystal forward e light exits from the optical isolator core at the point C (Dex=a and Dey=a).

In the case that the third crystal backward e light is backward propagated along the forward optical path, the third crystal backward e light is propagated in the e light polarization state in the birefringent crystal 13 with a displacement, and is propagated in the o light polarization state in the birefringent crystal 14 with no displacement. In the birefringent crystal 13 and the birefringent crystal 14, the backward optical path of the third crystal backward e light is completely coincident with the forward optical path. Subsequently, in response to the third crystal backward e light entering the 45-degree faraday rotator 12, the polarization direction of the third crystal backward e light is counterclockwise rotated at 45 degrees once more along a direction the same as that of the forward light. In this case, with respect to the polarization direction of the first crystal forward e light, the polarization direction of the third crystal backward e light is accumulatively rotated at 90 degrees. The backward light and the forward light are subjected to an o/e light polarization state exchange in the first birefringent crystal 11. The third crystal backward e light is propagated in the o light polarization state in the birefringent crystal 11 with no displacement. Finally, in response to the third crystal backward e light exiting from the birefringent crystal 11, the exit point of the third crystal backward e light deviates with respect to the incident point of the first crystal forward e light, and the third crystal backward e light fails to be coupled into the forward optical path. In this way, the backward light is isolated. According to the coordinate formulas rDex=rDex1+rDex2+rDex3+Dex and rDey=rDey1+rDey2+rDey3+Dey of the final exit point of the third crystal backward e light, the displacements of the backward o light in the birefringent crystal 11 and the birefringent crystal 14 and the displacement of the backward e light in the birefringent crystal 13 are introduced into the formulas to obtain the following formulas: rDex=rDoxI+rDoxIII+rDexII+Dex=0+0+α+a=2a, and rDey=rDoyI+rDoyIII+rDeyII+Dey=0+0+(−a)+α=0. That is, in response to exiting from the optical isolator core, the third crystal backward e light has a displacement of rDex=2a and rDey=O with respect to the incident point of the first crystal forward e light.

With reference to FIG. 11B and FIG. 11C, in response to exiting from the optical isolator core, the third crystal backward o light and the third crystal backward e light each deviate with respect to the incident point of the forward light in the optical isolator core, and both the third crystal backward o light and the third crystal backward e light fail to be coupled into the forward optical path. In this way, the polarization independent backward light is isolated.

In the embodiments of the present disclosure, description is given using a scenario where the forward light is normally incident on the birefringent crystal as an example. Likewise, the optical isolator core according to the embodiments of the present disclosure is also applicable to a scenario where the forward light is obliquely incident on the birefringent crystal. Like the scenario of normally incident of the light, the optical isolator core achieves the same displacement result on both the forward light and the backward light. That is, the forward o and e light are coincident with each other in response to exiting from the optical isolator core, and the backward o and e light is subjected to a displacement and thus deviates from the forward optical path in response to exiting from the optical isolator core.

It should be noted that the first birefringent crystal 91, the second birefringent crystal 92, and the third birefringent crystal 93 may be one single birefringent crystal, or may be a combination of multiple birefringent crystals which is equivalent to the single birefringent crystal in terms of displacement control. On the premise of satisfying requirements of the projection angle of the optical axis and the entire displacement, other birefringent crystals may be added before or after the birefringent crystals.

With the optical isolator core according to the embodiments of the present disclosure, by the parallel plate-structured first birefringent crystal, Faraday rotator, second birefringent crystal, and third birefringent crystal that are successively arranged along the forward optical path, in the case that the forward light travels through the optical isolator core, the first crystal forward o light and the first crystal forward e light generate the same displacement and are coincident with each other, an extremely high forward coupling efficiency and an extremely low polarization dependent loss (PDL) are achieved; and in the case that the backward light travels through the optical isolator core, due to two rotations in the polarization state by the Faraday rotator, the backward light is accumulatively rotated at 90 degrees with respect to the forward light, the forward light and the backward light are subjected to an o/e light polarization state exchange in the first birefringent crystal, and the third crystal backward o light and the third crystal backward e light each deviate with respect to the incident point of the forward light in response to exiting from the first birefringent crystal, such that the third crystal backward o light and the third crystal backward e light deviate from the forward optical path. In this way, the backward light is isolated. The optical isolator core is applicable to a non-collimating beam scenario insensitive to angle difference but sensitive to lateral displacements. In this way, optical isolation is implemented in the scenario of polarization independence and non-collimating beam.

Figure 12:
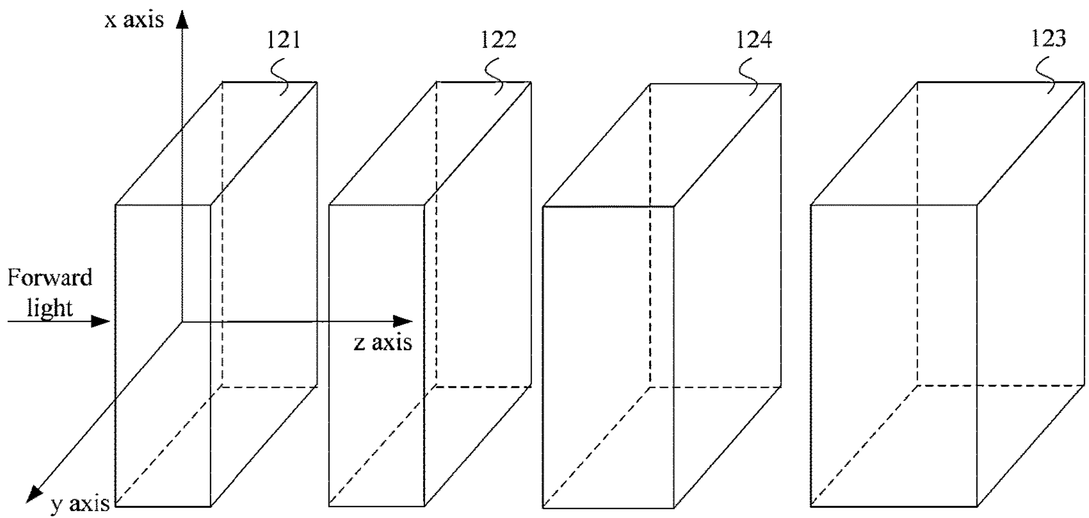
FIG. 12 is a schematic structural diagram of another optical isolator core according to an embodiment of the present disclosure.

FIG. 12 is a schematic structural diagram of another optical isolator core according to an embodiment of the present disclosure. The optical isolator core includes: a first birefringent crystal 121, a second birefringent crystal 122, a Faraday rotator 124, and a third birefringent crystal 123 that are successively arranged along a forward optical path. The first birefringent crystal 121, the second birefringent crystal 122, the Faraday rotator 124, and the third birefringent crystal 123 are all parallel plate structures.

In the case that forward light is incident on the first birefringent crystal 121, the first birefringent crystal 121 is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the second birefringent crystal 122 is configured to cause the first crystal forward o light and the first crystal forward e light to respectively generate a second displacement of the first crystal forward o light and a second displacement of the first crystal forward e light; the Faraday rotator 124 is configured to respectively rotate, at a rotation angle α, the polarization directions of the first crystal forward o light and the first crystal forward e light that travel through the second birefringent crystal 122 to form rotated first crystal forward o light and rotated first crystal forward e light; and the third birefringent crystal 123 is configured to cause the rotated first crystal forward o light and the rotated first crystal forward e light to respectively generate a third displacement of the first crystal forward o light and a third displacement of the first crystal forward e light.

A sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal 123.

In the case that backward light entering backward along the forward optical path is incident on the third birefringent crystal 123, the third birefringent crystal 123 is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the Faraday rotator 124 is configured to respectively rotate, at the rotation angle $\alpha$ and along the same direction of the forward light, the polarization directions of the third crystal backward o light and the third crystal backward e light to form rotated third crystal backward o light and rotated third crystal backward e light; the second birefringent crystal 122 is configured to cause the rotated third crystal backward o light and the rotated third crystal backward e light to respectively generate a second displacement of the third crystal backward o light and a second displacement of the third crystal backward e light; and the first birefringent crystal 121 is configured to cause the third crystal backward o light and the third crystal backward e light that travel through the second birefringent crystal 122 to respectively generate a first displacement of the third crystal backward o light and a first displacement of the third crystal backward e light.

A sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

It should be noted that the first crystal forward o light and the first crystal forward e light refer to the forward o light and the forward e light separated in the first birefringent crystal 121 and are o light and e light with respect to the first birefringent crystal 121, and in other crystals, the light may be propagated in the o light polarization state or in the e light polarization state; and the third crystal backward o light and the third crystal backward e light refer to the backward o light and the backward e light separated in the third birefringent crystal 123 and are o light and e light with respect to the third birefringent crystal 123, and the light may be propagated in the o light polarization state or in the e light polarization state in other crystals.

In a preferred embodiment, a projection angle of an optical axis of the first birefringent crystal 121 on an incident surface of the forward light is $\varphi 1$, a projection angle of an optical axis of the second birefringent crystal 122 on the incident surface of the forward light is $\varphi^2$, and a projection angle of an optical axis of the third birefringent crystal 123 on an incident surface of the forward light is $\varphi 3$.

A value of $\varphi 3$ satisfies: $0° \varphi 3 \leq 360°$, a relationship between $\varphi 2$ and $\varphi 3$ satisfies: $|\varphi 2-\varphi 3|=\alpha$, $90°+\alpha$, $180°+\alpha$ or $270°+\alpha$, and a relationship between $\varphi 1$ and $\varphi 2$ satisfies: $|\varphi 1-\varphi 2|=90°\pm 20°$ or $270°\pm 20°$. A preferred value of $|\varphi 1-\varphi 2|$ is 90° or 270°. That is, a projection line of the optical axis of the first birefringent crystal 121 on the incident surface of the forward light is angular-orthogonal to a projection line of the optical axis of the second birefringent crystal 122 on the incident surface of the forward light. However, in practice, a value within $90°\pm 20°$ or $270°\pm 20°$ may be taken.

Likewise, using an incident point of the forward light on the first birefringent crystal 121 as an origin point, a Cartesian coordinate system may be formed on an incident surface of the first birefringent crystal 121. The projection angle of the optical axis on the incident surface of the forward light is an angle at which the y axis is counterclockwise rotated along the propagating direction of the forward light to a projection of the optical axis on the incident surface (the xy plane).

A preferred value of the rotation angle $\alpha$ of the Faraday rotator 124 is 45 degrees, and in practice, another angle approximate to 45 degrees may also be taken. In response to the polarization direction of the forward light being rotated by the Faraday rotator 124, the forward light is propagated as the o light or the e light in the next birefringent crystals; and in response to the polarization direction of the backward light being rotated once more along the same direction of the forward light by the Faraday rotator 124, the forward light and the backward light are subjected to an o/e light polarization state exchange in the first birefringent crystal 121 and the second birefringent crystal 122. The backward light is subjected to a displacement and deviates from the forward optical path, such that a minimum insertion loss (IL), a minimum polarization dependent loss (PDL) of the forward light and a maximum isolation (ISO) of the backward light are simultaneously achieved.

An included angle $\theta$ between an optical axis of the birefringent crystal and a normal of an incident surface may be referred to as a walk-off angle, wherein a value of $\theta$ satisfies: $0°<\theta<90°$ or $-90°<\theta<0°$, and the walk-off angle is configured to control a relative walk-off between an exiting o light and an exiting e light in response to the light traveling through the birefringent crystal.

As described above, the first displacement of the first crystal forward o light includes a displacement Dox1 along the x axis and a displacement Doy1 along the y axis of the exit point with respect to the incident point in the case that the light travels through the first birefringent crystal 121, and the first displacement of the first crystal forward e light includes a displacement Dex1 along the x axis and a displacement Dey1 along the y axis of the exit point with respect to the incident point in the case that the light travels through the first birefringent crystal 121. The second displacement of the first crystal forward o light includes a displacement Dox2 along the x axis and a displacement Doy2 along the y axis of the exit point with respect to the incident point in the case that the light travels through the second birefringent crystal 122, and the second displacement of the first crystal forward e light includes a displacement Dex2 along the x axis and a displacement Dey2 along the y axis of the exit point with respect to the incident point in the case that the light travels through the second birefringent crystal 122. The third displacement of the first crystal forward o light includes a displacement Dox3 along the x axis and a displacement Doy3 along the y axis of the exit point with respect to the incident point in the case that the light travels through the third birefringent crystal 123, and the third displacement of the first crystal forward e light includes a displacement Dex3 along the x axis and a displacement Dey3 along the y axis of the exit point with respect to the incident point in the case that the light travels through the third birefringent crystal 123.

In the case that the first crystal forward o light exits from the third birefringent crystal 123, in the Cartesian coordinate system formed on the incident surface of the forward light of the first birefringent crystal 121, the x-axis coordinate of the exit point is Dox, and the y-axis coordinate of the exit point is Doy. In this case, Dox=Dox1+Dox2+Dox3, and Doy=Doy1+Doy2+Doy3. Likewise, in the case that the first crystal forward e light exits from the third birefringent crystal 123, in the Cartesian coordinate system, the x-axis coordinate of the exit point is Dex, and the y-axis coordinate of the exit point is Dey. In this case, Dex=Dex1+Dex2+Dex3, and Dey=Dey1+Dey2+Dey3. Accordingly, Dox=Dex, and Doy=Dey. In this case, the first crystal forward o light and the first crystal forward e light are coincident with each other in response to exiting from the third birefringent crystal 123 (a final exit point in response to exiting from the optical isolator core). That is, the displacements of the first crystal forward o light and the first crystal forward e light in the crystals may be adjusted by reasonably defining the walk-off angle θ, the material, and/or the thickness of the birefringent crystals; and by reasonably defining the relations of the projection angles φ of the optical axes of the crystals, and the rotation angle α of the Faraday rotator, the first crystal forward o light and the first crystal forward e light have the same coordinate position in the Cartesian coordinate system in response to exiting from the optical isolator core, and are coincident with each other at the final exit point.

Likewise, the third displacement of the third crystal backward o light includes a displacement rDox3 along the x axis and a displacement rDoy3 along the y axis of the exit point with respect to the incident point in the case that the light travels through the third birefringent crystal 123, and the third displacement of the third crystal backward e light includes a displacement rDex3 along the x axis and a displacement rDey3 along the y axis of the exit point with respect to the incident point in the case that the light travels through the third birefringent crystal 123. The second displacement of the third crystal backward o light includes a displacement rDox2 along the x axis and a displacement rDoy2 along the y axis of the exit point with respect to the incident point in the case that the light travels through the second birefringent crystal 122, and the second displacement of the third crystal backward e light includes a displacement rDex2 along the x axis and a displacement rDey2 along the y axis of the exit point with respect to the incident point in the case that the light travels through the second birefringent crystal 122. The first displacement of the third crystal backward o light includes a displacement rDox1 along the x axis and a displacement rDoy1 along the y axis of the exit point with respect to the incident point in the case that the light travels through the first birefringent crystal 121, and the first displacement of the third crystal backward e light includes a displacement rDex1 along the x axis and a displacement rDey1 along the y axis of the exit point with respect to the incident point in the case that the light travels through the first birefringent crystal 121.

In the case that the third crystal backward o light exits from the first birefringent crystal 121, in the Cartesian coordinate system formed on the incident surface of the forward light of the first birefringent crystal 121, the x-axis coordinate of the exit point is rDox, and the y-axis coordinate of the exit point is rDoy. In this case, rDox=rDox1+rDox2+rDox3+Dox, and rDoy=rDoy1+rDoy2+rDoy3+Doy. Likewise, in the case that the third crystal backward e light exits from the first birefringent crystal 121, in the Cartesian coordinate system, the x-axis coordinate of the exit point is rDex, and the y-axis coordinate of the exit point is rDey. In this case, rDex=rDex1+rDex2+rDex3+Dex, and rDey=rDey1+rDey2+rDey3+Dey. A displacement of the coordination position of the exit point of the third crystal backward o light in the first birefringent crystal 121 with respect to the incident point of the forward light in the first birefringent crystal 121 (that is, the origin point of the Cartesian coordinate system) causes the backward o light to deviate from the forward optical path, and a displacement of the coordinate position of the exit point of the third crystal backward e light in the first birefringent crystal 121 with respect to the incident point of the forward light in the first birefringent crystal 121 causes the backward e light to deviate from the forward optical path.

Depending on different polarization states of the light in the three birefringent crystals, the optical isolator core according to this embodiment may involve the following two examples.

In a third example, the polarization states of the first crystal forward o light in the three birefringent crystals are successively o-e-o, and the polarization states of the first crystal forward e light in the three birefringent crystals are successively e-o-e.

Specifically, the second birefringent crystal 122 is further configured to cause the first crystal forward o light to be propagated in the e light polarization state when traveling through the second birefringent crystal 122, and cause the first crystal forward e light to be propagated in the o light polarization state when traveling through the second birefringent crystal 122.

Specifically, the third birefringent crystal 123 is further configured to cause the first crystal forward o light rotated by the Faraday rotator 124 to be still propagated in the o light polarization state when traveling through the third birefringent crystal 123, and cause the first crystal forward e light rotated by the Faraday rotator 124 to be still propagated in the e light polarization state when traveling through the third birefringent crystal 123.

Specifically, the first birefringent crystal 121 may be the birefringent crystal 13, the second birefringent crystal 122 may be the birefringent crystal 14, and the third birefringent crystal 123 may be the birefringent crystal 11. As described above, the projection angles of the optical axes of these three birefringent crystals on the incident surface of the forward light are respectively φ11=90°, φ13=315°, and φ14=45°. The Faraday rotator 124 may be the Faraday rotator 12. A rotatory direction of the Faraday rotator 12 is reasonably defined. In this example, the light is clockwise rotated at a rotation angle α=45° along the propagating direction of the forward light. In this case, |φ2−φ3|=|φ14−φ11|=|45°−90°=α, and |φ1−φ2|=|φ13−φ14=|315°−45°=270°, and the relation requirements of φ1, φ2 and φ3 are satisfied.

Figure 13A:
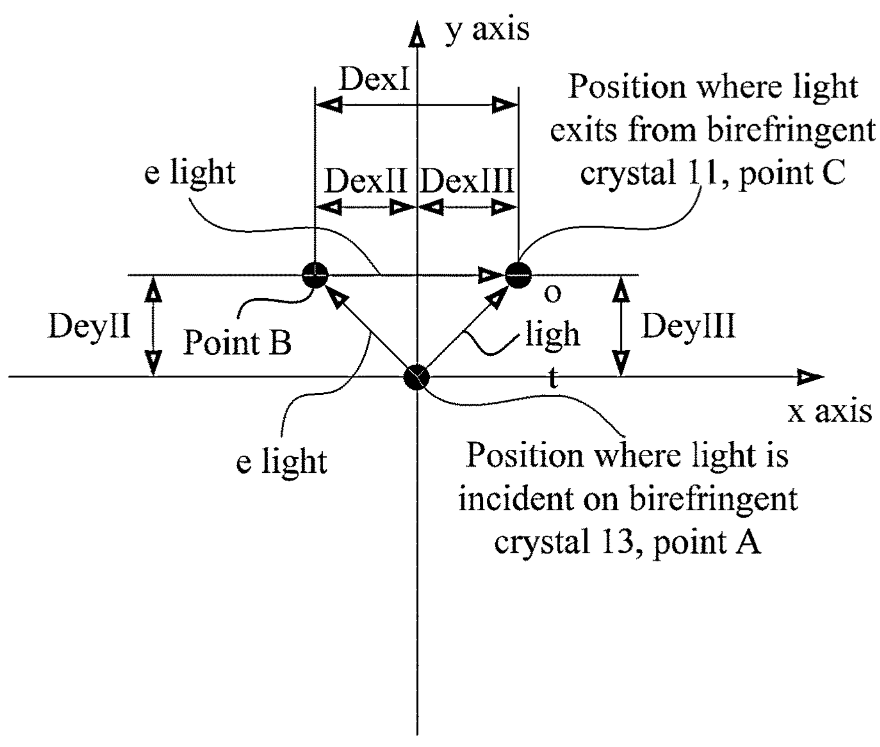
FIG. 13A is a schematic diagram of a sum of displacements of forward light according to a third embodiment of the present disclosure.

FIG. 13A is a schematic diagram of a sum of displacements of forward light according to a third embodiment of the present disclosure. Using a scenario where the forward light is normally incident on the birefringent crystal 13 at the point A as an example, in response to entering the birefringent crystal 13, the forward light is separated into the first crystal forward o light and the first crystal forward e light. The first crystal forward o light is propagated in the birefringent crystal 13 in the o light polarization state, with no displacement and the exit point at the point A. Afterwards, the first crystal forward o light enters the birefringent crystal 14. Since |φ13−φ14|=|315°−45°|=270°, the first crystal forward o light is propagated in the e light polarization state in the birefringent crystal 14, with a displacement and the exit point at the point C. In response to the first crystal forward o light entering the 45-degree faraday rotator 12, the polarization direction of the first crystal forward o light is clockwise rotated at 45 degrees along the propagating direction of the forward light. In this case, the first crystal forward o light is still propagated in the o light polarization state in the birefringent crystal 11 with no displacement. Finally, the exit point of the first crystal forward o light in the birefringent crystal 11 is subjected to a specific displacement, and the final exit point is at the point C. According to the coordinate formulas Dox=Dox1+Dox2+Dox3 and Doy=Doy1+Doy2+Doy3 of the final exit point of the first crystal forward o light in response to exiting from the optical isolator core, the displacements of the forward o light in the birefringent crystal 11 and the birefringent crystal 13, and the displacement of the forward e light in the birefringent crystal 14 are introduced into the formulas to obtain the following formulas: Dox=DoxII+DexIII+DoxI=0+α+0=a, and Doy=DoyII+DeyIII+DoyI=0+α+0=a.

The first crystal forward e light is propagated in the birefringent crystal 13 in the e light polarization state, with a displacement and the exit point at the point B. Afterwards, the first crystal forward e light enters the birefringent crystal 14, and travels through the birefringent crystal 14 in the o light polarization state, with no displacement and the exit point still at the point B. In response to the first crystal forward e light entering the 45-degree faraday rotator 12, the polarization direction of the first crystal forward e light is clockwise rotated at 45 degrees along the propagating direction of the forward light. In this case, the first crystal forward e light travels through the birefringent crystal 11 in the e light polarization state, with a displacement and the exit point at the point C. According to the coordinate formulas Dex=Dex1+Dex2+Dex3 and Dey=Dey1+Dey2+Dey3 of the final exit point of the first crystal forward e light, the displacements of the forward e light in the birefringent crystal 11 and the birefringent crystal 13, and the displacement of the forward o light in the birefringent crystal 14 are introduced into the formulas to obtain the following formulas: Dex=DexII+DoxIII+DexI=(−a)+0+2a=a, and Dey=DeyII+DoyIII+DeyI=a+0+0=a.

Therefore, Dex=Dox=a and Dey=Doy=a, that is, the first crystal forward o light and the first crystal forward e light have the same coordinate position, that is, the C point, in response to exiting from the optical isolator core, and the exit points of the first crystal forward o light and the first crystal forward e light are coincident with each other. Therefore, a maximum coupling efficiency and a minimum polarization dependent loss (PDL) are achieved for the forward light.

Figure 13B:
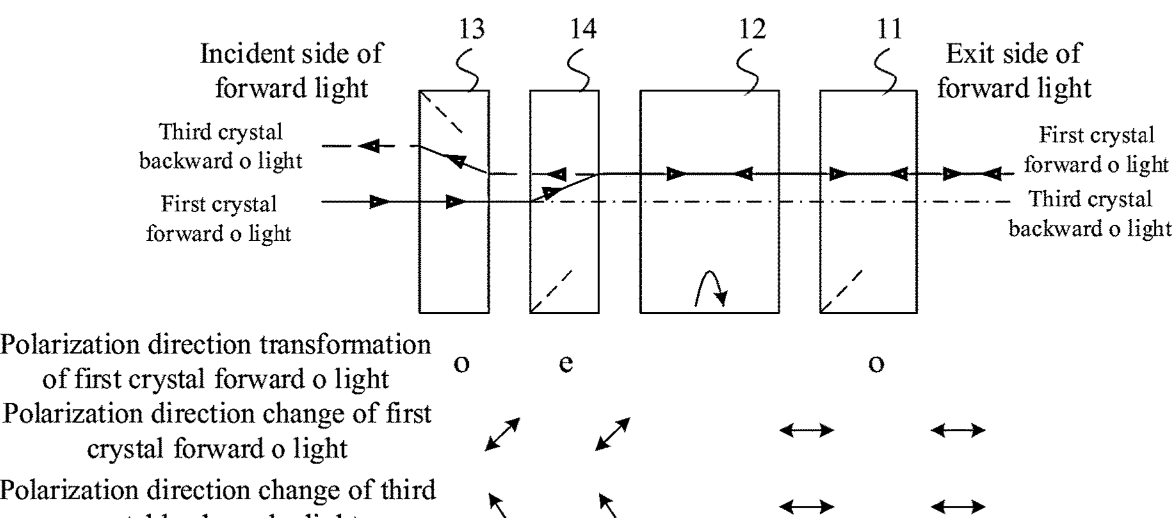
FIG. 13B is a schematic diagram of optical paths, polarization state transformation, and optical isolation of first crystal forward o light and third crystal backward o light according to the third embodiment of the present disclosure.

FIG. 13B is a schematic diagram of optical paths, polarization state transformation, and optical isolation of first crystal forward o light and third crystal backward o light according to the third embodiment of the present disclosure. Description is given hereinafter using a scenario where the forward light is normally incident on the birefringent crystal 13 as an example. As illustrated in FIG. 13A, the first crystal forward o light exits from the optical isolator core at the point C (Dox=a and Doy=a).

In the case that the third crystal backward o light is backward propagated along the forward optical path, the third crystal backward o light is propagated in the o light polarization state in the birefringent crystal 11 with no displacement. In the birefringent crystal 11, the backward optical path of the third crystal backward o light is completely coincident with the forward optical path. Subsequently, in response to the third crystal backward o light entering the 45-degree faraday rotator 12, the polarization direction of the third crystal backward o light is clockwise rotated at 45 degrees once more along a direction the same as that of the forward light. In this case, with respect to the polarization direction of the first crystal forward o light, the polarization direction of the third crystal backward o light is accumulatively rotated at 90 degrees. The backward light and the forward light are subjected to an o/e light polarization state exchange in the birefringent crystal 14 and the birefringent crystal 13. The third crystal backward o light is propagated in the o light polarization state in the birefringent crystal 14 with no displacement. Afterwards, the third crystal backward o light is propagated in the e light polarization state in the birefringent crystal 13 with a displacement. Finally, in response to the third crystal backward o light exiting from the birefringent crystal 13, the exit point of the third crystal backward o light deviates with respect to the incident point of the first crystal forward o light, and the third crystal backward o light fails to be coupled into the forward optical path. In this way, the backward light is isolated. According to the coordinate formulas rDox=rDox1+rDox2+rDox3+Dox and rDoy=rDoy1+rDoy2+rDoy3+Doy of the final exit point of the third crystal backward o light in response to exiting from the optical isolator core, the displacements of the backward o light in the birefringent crystal 11 and the birefringent crystal 14 and the displacement of the backward e light in the birefringent crystal 13 are introduced into the formulas to obtain the following formulas: rDox=rDexII+rDoxIII+rDoxI+Dox=a+0+0+α=2a, and rDoy=rDeyII+rDoyIII+rDoyI+Doy=(−a)+0+0+α=0. That is, in response to exiting from the optical isolator core, the third crystal backward o light has a displacement of rDox=2a and rDoy=0 with respect to the incident point of the first crystal forward o light.

Figure 13C:
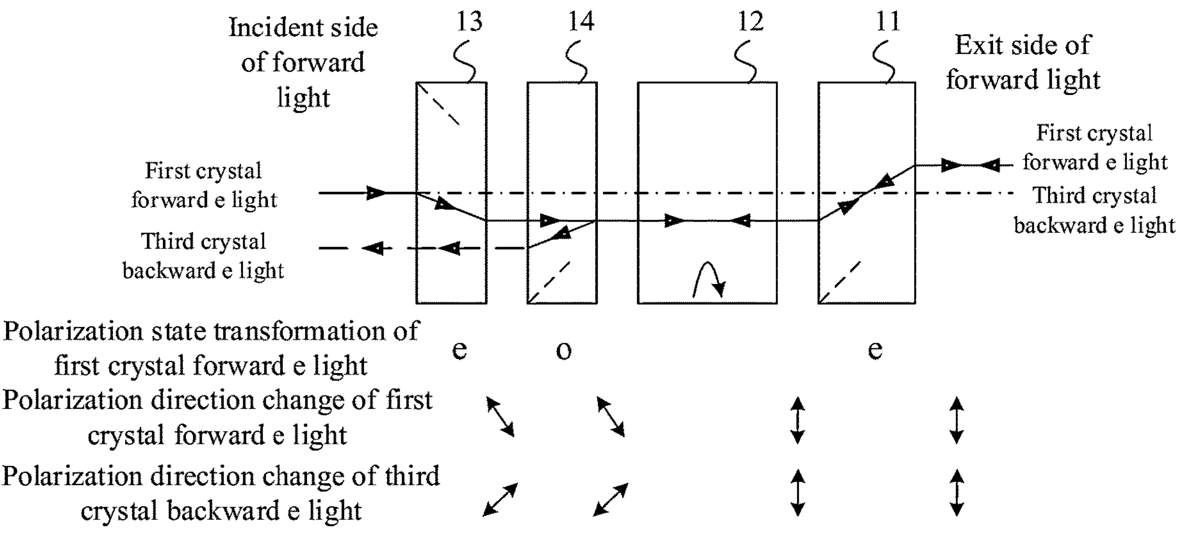
FIG. 13C is a schematic diagram of optical paths, polarization state transformation, and optical isolation of first crystal forward e light and third crystal backward e light according to the third embodiment of the present disclosure.

FIG. 13C is a schematic diagram of optical paths, polarization state transformation, and optical isolation of first crystal forward e light and third crystal backward e light according to the third embodiment of the present disclosure. Description is given hereinafter using a scenario where the forward light is normally incident on the birefringent crystal 13 as an example. As illustrated in FIG. 13A, the first crystal forward e light exits from the optical isolator core at the point C (Dex=a and Dey=a).

In the case that the third crystal backward e light is backward propagated along the forward optical path, the third crystal backward e light is propagated in the e light polarization state in the birefringent crystal 11 with a displacement. In the birefringent crystal 11, the backward optical path of the third crystal backward e light is completely coincident with the forward optical path. Subsequently, in response to the third crystal backward e light entering the 45-degree faraday rotator 12, the polarization direction of the third crystal backward e light is clockwise rotated at 45 degrees once more along a direction the same as that of the forward light. In this case, with respect to the polarization direction of the first crystal forward e light, the polarization direction of the third crystal backward e light is accumulatively rotated at 90 degrees. The backward light and the forward light are subjected to an o/e light polarization state exchange in the birefringent crystal 14 and the birefringent crystal 13. The third crystal backward e light is propagated in the e light polarization state in the birefringent crystal 14 with a displacement. Afterwards, the third crystal backward e light is propagated in the o light polarization state in the birefringent crystal 13 with no displacement. Finally, in response to the third crystal backward e light exiting from the birefringent crystal 13, the exit point of the third crystal backward e light deviates with respect to the incident point of the first crystal forward e light, and the third crystal backward e light fails to be coupled into the forward optical path. In this way, the backward light is isolated. According to the coordinate formulas rDex=rDex1+rDex2+rDex3+Dex and rDey=rDey1+rDey2+rDey3+Dey of the final exit point of the third crystal backward e light, the displacements of the backward e light in the birefringent crystal 11 and the birefringent crystal 14 and the displacement of the backward o light in the birefringent crystal 13 are introduced into the formulas to obtain the following formulas: rDex=rDoxII+rDexIII+rDexI+Dex=0+(−a)+(−2a)+α=−2a, and rDey=rDoyII+rDeyIII+rDeyI+Dey=0+(−a)+0+α=0. That is, in response to exiting from the optical isolator core, the third crystal backward e light has a displacement of rDex=−2a and rDey=0 with respect to the incident point of the first crystal forward o light.

With reference to FIG. 13B and FIG. 13C, in response to exiting from the optical isolator core, the third crystal backward o light and the third crystal backward e light each deviate with respect to the incident point of the forward light in the optical isolator core, and both the third crystal backward o light and the third crystal backward e light fail to be coupled into the forward optical path. In this way, the polarization independent backward light is isolated.

In a fourth example, the polarization states of the first crystal forward o light in the three birefringent crystals are successively o-e-e, and the polarization states of the first crystal forward e light in the three birefringent crystals are successively e-o-o.

Specifically, the second birefringent crystal 122 is further configured to cause the first crystal forward o light to be propagated in the e light polarization state when traveling through the second birefringent crystal 122, and cause the first crystal forward e light to be propagated in the o light polarization state when traveling through the second birefringent crystal 122.

Specifically, the third birefringent crystal 123 is further configured to cause the first crystal forward o light rotated by the Faraday rotator 124 to be propagated in the e light polarization state when traveling through the third birefringent crystal 123, and cause the first crystal forward e light rotated by the Faraday rotator 124 to be propagated in the o light polarization state when traveling through the third birefringent crystal 123.

The fourth example is different from the third example mainly in that the forward light is propagated in the third birefringent crystal 123 in a polarization state different from that in the third example. Accordingly, based on the third example, the rotation direction of the Faraday rotator 124 may be changed (that is, the rotation direction is changed from the clockwise direction along the propagating direction of the forward light to the counterclockwise direction along the propagating direction of the forward light), or the projection angles of the optical axes of the first birefringent crystal 121 and the second birefringent crystal 122 are exchanged.

In this embodiment, description is given using a scenario where the projection angles of the optical axes of the first birefringent crystal 121 and the second birefringent crystal 122 are exchanged as an example. Specifically, the first birefringent crystal 121 may be the birefringent crystal 14, the second birefringent crystal 122 may be the birefringent crystal 13, and the third birefringent crystal 123 may be the birefringent crystal 11. As described above, the projection angles of the optical axes of these three birefringent crystals are respectively (11=90°, φ13=315°, and φ14=45°. The Faraday rotator 124 may be the Faraday rotator 12. A rotatory direction of the Faraday rotator 12 is reasonably defined. In this example, the light is clockwise rotated at a rotation angle α=45° along the propagating direction of the forward light. In this case, |φ2−φ3|=|φ13−φ11|=|315°−90°|=180°+α, and |φ1−φ2|=|φ14−φ13|=|45°−315°=270°, and the relation requirements of φ1, φ2 and φ3 are satisfied.

Figure 14A:
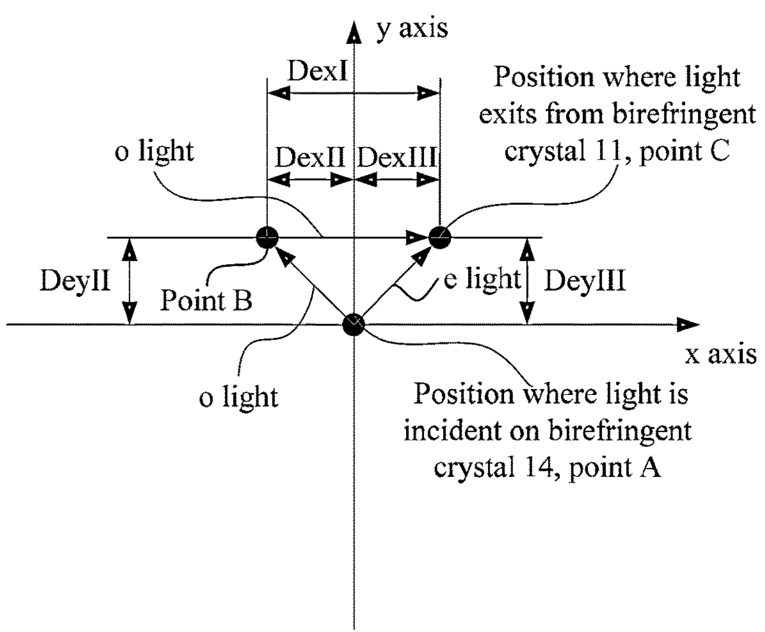
FIG. 14A is a schematic diagram of a sum of displacements of forward light according to a fourth embodiment of the present disclosure.

FIG. 14A is a schematic diagram of a sum of displacements of forward light according to a fourth embodiment of the present disclosure. Using a scenario where the forward light is normally incident on the birefringent crystal 14 at the point A as an example, in response to entering the birefringent crystal 14, the forward light is separated into the first crystal forward o light and the first crystal forward e light. The first crystal forward o light is propagated in the birefringent crystal 14 in the o light polarization state, with no displacement and the exit point at the point A. Afterwards, the first crystal forward o light enters the birefringent crystal 13. Since |φ14−φ13|=45°−315°=270°, the first crystal forward o light is propagated in the e light polarization state in the birefringent crystal 13, with a displacement and the exit point at the point B. In response to the first crystal forward o light entering the 45-degree faraday rotator 12, the polarization direction of the first crystal forward o light is clockwise rotated at 45 degrees along the propagating direction of the forward light. In this case, the first crystal forward o light is propagated in the e light polarization state in the birefringent crystal 11, with a displacement and the final exit point at the point C. According to the coordinate formulas Dox=Dox1+Dox2+Dox3 and Doy=Doy1+Doy2+Doy3 of the final exit point of the first crystal forward o light in response to exiting from the optical isolator core, the displacements of the forward e light in the birefringent crystal 11 and the birefringent crystal 13, and the displacement of the forward o light in the birefringent crystal 14 are introduced into the formulas to obtain the following formulas: Dox=DoxIII+DexII+DexI=0+(−a)+2a=a, and Doy=DoyIII+DeyII+DeyI=0+α+0=a.

The first crystal forward e light is propagated in the birefringent crystal 14 in the e light polarization state, with a displacement and the exit point at the point C. Afterwards, the first crystal forward e light enters the birefringent crystal 13, and is propagated in the birefringent crystal 13 in the o light polarization state, with no displacement and the exit point still at the point C. In response to the first crystal forward e light entering the 45-degree faraday rotator 12, the polarization direction of the first crystal forward e light is clockwise rotated at 45 degrees along the propagating direction of the forward light. In this case, the first crystal forward e light travels through the birefringent crystal 11 in the o light polarization state, with no displacement and the final exit point at the point C. According to the coordinate formulas Dex=Dex1+Dex2+Dex3 and Dey=Dey1+Dey2+Dey3 of the final exit point of the first crystal forward e light, the displacements of the forward o light in the birefringent crystal 11 and the birefringent crystal 13, and the displacement of the forward e light in the birefringent crystal 14 are introduced into the formulas to obtain the following formulas: Dex=DexIII+DoxII+DoxI=a+0+0=a, and Dey=DeyIII+DoyII+DoyI=a+0+0=a.

Therefore, Dex=Dox=a and Dey=Doy=a, that is, the first crystal forward o light and the first crystal forward e light have the same coordinate position, that is, the C point, in response to exiting from the optical isolator core, and the exit points of the first crystal forward o light and the first crystal forward e light are coincident with each other.

Therefore, a maximum coupling efficiency and a minimum polarization dependent loss (PDL) are achieved for the forward light.

Figure 14B:
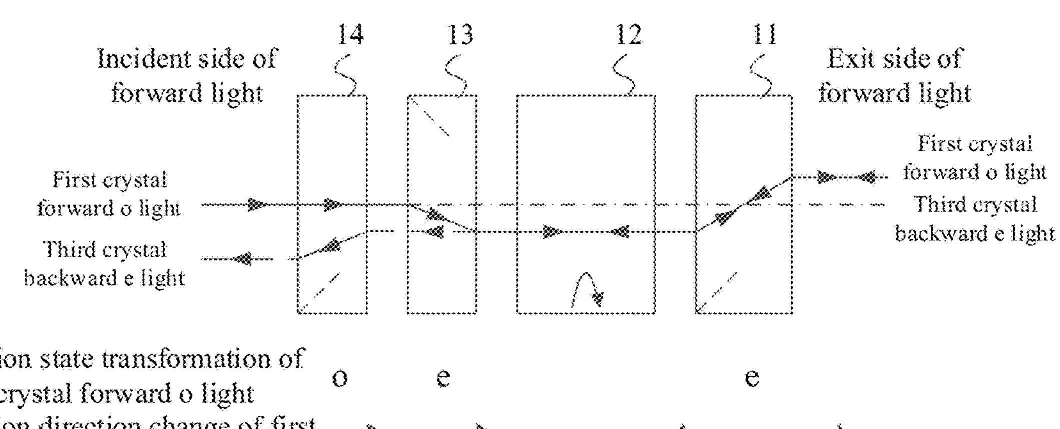
FIG. 14B is a schematic diagram of optical paths, polarization state transformation, and optical isolation of first crystal forward o light and third crystal backward e light according to the fourth embodiment of the present disclosure.
Figure 14B:
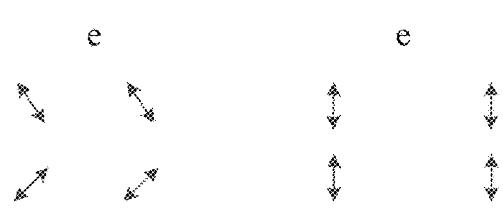

FIG. 14B is a schematic diagram of optical paths, polarization state transformation, and optical isolation of first crystal forward o light and third crystal backward e light according to the fourth embodiment of the present disclosure. Description is given hereinafter using a scenario where the forward light is normally incident on the birefringent crystal 14 as an example. As illustrated in FIG. 14A, the first crystal forward o light exits from the optical isolator core at the point C ($Dox=a$ and $Doy=a$).

In the case that the third crystal backward e light is backward propagated along the forward optical path, the third crystal backward e light is propagated in the e light polarization state in the birefringent crystal 11 with a displacement. In the birefringent crystal 11, the backward optical path of the third crystal backward e light is completely coincident with the forward optical path. Subsequently, in response to the third crystal backward e light entering the 45-degree faraday rotator 12, the polarization direction of the third crystal backward e light is clockwise rotated at 45 degrees once more along a direction the same as that of the forward light. In this case, with respect to the polarization direction of the first crystal forward o light, the polarization direction of the third crystal backward e light is accumulatively rotated at 90 degrees. The backward light and the forward light are subjected to an o/e light polarization state exchange in the birefringent crystal 13 and the birefringent crystal 14. The third crystal backward e light is propagated in the o light polarization state in the birefringent crystal 13 with no displacement. Afterwards, the third crystal backward e light is propagated in the e light polarization state in the birefringent crystal 14 with a displacement. Finally, in response to the third crystal backward e light exiting from the birefringent crystal 14, the exit point of the third crystal backward e light deviates with respect to the incident point of the first crystal forward o light, and the third crystal backward e light fails to be coupled into the forward optical path. In this way, the backward light is isolated. According to the coordinate formulas $rDex=rDex1+rDex2+rDex3+Dex$ and $rDey=rDey1+rDey2+rDey3+Dey$ of the final exit point of the third crystal backward e light in response to exiting from the optical isolator core, the displacements of the backward e light in the birefringent crystal 11 and the birefringent crystal 14 and the displacement of the backward o light in the birefringent crystal 13 are introduced into the formulas to obtain the following formulas: $rDex=rDexIII+rDoxII+rDexI+Dex=(-a)+0+(-2a)+\alpha=-2a$, and $rDey=rDeyIII+rDoyII+rDeyI+Dey=(-a)+0+0+\alpha=0$. That is, in response to exiting from the optical isolator core, the third crystal backward e light has a displacement of $rDex=-2a$ and $rDey=0$ with respect to the incident point of the first crystal forward o light.

Figure 14C:
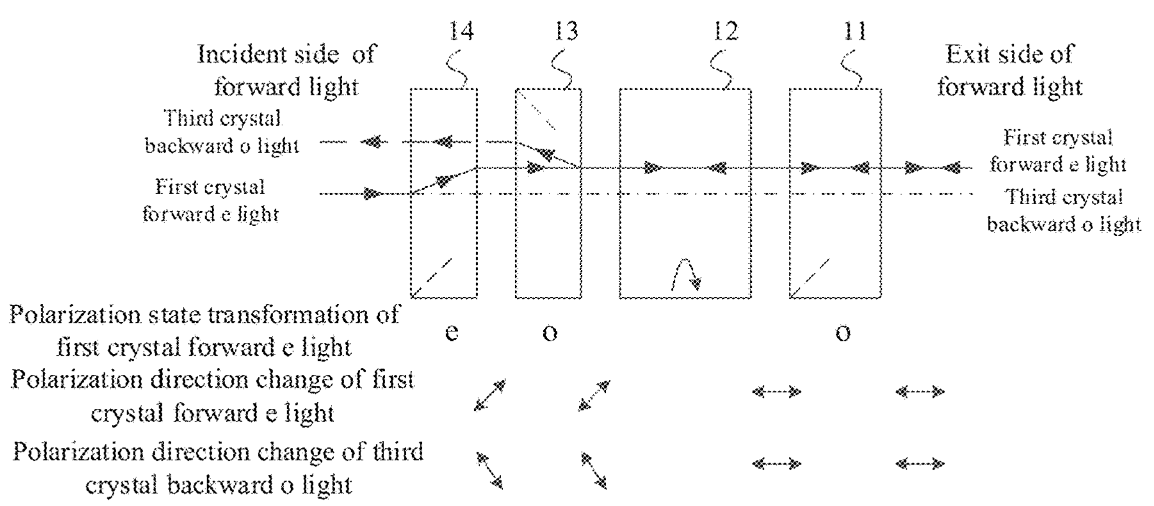
FIG. 14C is a schematic diagram of optical paths, polarization state transformation, and optical isolation of first crystal forward e light and third crystal backward o light according to the fourth embodiment of the present disclosure.

FIG. 14C is a schematic diagram of optical paths, polarization state transformation, and optical isolation of first crystal forward e light and third crystal backward o light according to the fourth embodiment of the present disclosure. Description is given hereinafter using a scenario where the forward light is normally incident on the birefringent crystal 14 as an example. As illustrated in FIG. 14A, the first crystal forward e light exits from the optical isolator core at the point C ($Dex=a$ and $Dey=a$).

In the case that the third crystal backward o light is backward propagated along the forward optical path, the third crystal backward o light is propagated in the o light polarization state in the birefringent crystal 11 with no displacement. In the birefringent crystal 11, the backward optical path of the third crystal backward o light is coincident with the forward optical path. Subsequently, in response to the third crystal backward o light entering the 45-degree faraday rotator 12, the polarization direction of the third crystal backward o light is clockwise rotated at 45 degrees once more along a direction the same as that of the forward light. In this case, with respect to the polarization direction of the first crystal forward e light, the third crystal backward o light is accumulatively rotated at 90 degrees. The backward light and the forward light are subjected to an o/e light polarization state exchange in the birefringent crystal 13 and the birefringent crystal 14. The third crystal backward o light is propagated in the e light polarization state in the birefringent crystal 13 with a displacement. Afterwards, the third crystal backward o light is propagated in the o light polarization state in the birefringent crystal 14 with no displacement. Finally, in response to the third crystal backward o light exiting from the birefringent crystal 14, the exit point of the third crystal backward o light deviates with respect to the incident point of the first crystal forward e light, and the third crystal backward o light fails to be coupled into the forward optical path. In this way, the backward light is isolated. According to the coordinate formulas $rDox=rDox1+rDox2+rDox3+Dox$ and $rDoy=rDoy1+rDoy2+rDoy3+Doy$ of the final exit point of the third crystal backward o light, the displacements of the backward o light in the birefringent crystal 11 and the birefringent crystal 14 and the displacement of the backward e light in the birefringent crystal 13 are introduced into the formulas to obtain the following formulas: $rDox=rDoxIII+rDexII+rDoxI+Dox=0+\alpha+0+\alpha=2a$, and $rDoy=rDoyIII+rDeyII+rDoyI+Doy=0+(-a)+0+\alpha=0$. That is, in response to exiting from the optical isolator core, the third crystal backward o light has a displacement of $rDox=2a$ and $rDoy=0$ with respect to the incident point of the first crystal forward e light.

With reference to FIG. 14B and FIG. 14C, in response to exiting from the optical isolator core, the third crystal backward o light and the third crystal backward e light each deviate with respect to the incident point of the forward light in the optical isolator core, and both the third crystal backward o light and the third crystal backward e light fail to be coupled into the forward optical path. In this way, the polarization independent backward light is isolated.

In the embodiments of the present disclosure, description is given using a scenario where the forward light is normally incident on the birefringent crystal as an example. Likewise, the optical isolator core according to the embodiments of the present disclosure is also applicable to a scenario where the forward light is obliquely incident on the birefringent crystal. Like the scenario of normally incident of the light, the optical isolator core achieves the same displacement results on both the forward light and the backward light. That is, the forward o and e light are coincident with each other in response to exiting from the optical isolator core, and the backward o and e light is subjected to a displacement and thus deviates from the forward optical path in response to exiting from the optical isolator core.

It should be noted that the first birefringent crystal 121, the second birefringent crystal 122, and the third birefringent crystal 123 may be one single birefringent crystal, or may be a combination of multiple birefringent crystals which is equivalent to the single birefringent crystal in terms of displacement control. On the premise of satisfying requirements of the projection angle of the optical axis and the entire displacement, other birefringent crystals may be added before or after the birefringent crystals.

With the optical isolator core according to the embodiments of the present disclosure, by the parallel plate-structured first birefringent crystal, second birefringent crystal, Faraday rotator, and third birefringent crystal that are successively arranged along the forward optical path, in the case that the forward light travels through the optical isolator core, the first crystal forward o light and the first crystal forward e light are subjected to the same displacement and are coincident with each other; and in the case that the backward light travels through the optical isolator core, due to two rotations in the polarization state by the Faraday rotator, the backward light is accumulatively rotated at 90 degrees with respect to the forward light, the forward light and the backward light are subjected to an o/e light polarization state exchange in the first birefringent crystal and the second birefringent crystal, and the third crystal backward o light and the third crystal backward e light each deviate with respect to incident point of the forward light in response to exiting from the first birefringent crystal, such that the third crystal backward o light and the third crystal backward e light deviate from the forward optical path. In this way, the backward light is isolated. In the embodiments of the present disclosure, the birefringent crystals are all parallel plate structures, and the displacements of the o light and the e light are correctly defined. Finally, the first crystal forward o light and the first crystal forward e light are subjected to the same displacement and are coincident with each other in response to exiting from the optical isolator core. The optical isolator core has an extremely high forward coupling efficiency and an extremely low polarization dependent loss (PDL). In addition, due to adoption of the approach for causing the backward light to be laterally displaced with respect to the forward light, the optical isolator core is applicable to a non-collimating beam scenario insensitive to angle difference but sensitive to lateral displacements. In this way, optical isolation is implemented in the scenario of polarization independence and non-collimating beam.

Figure 15:
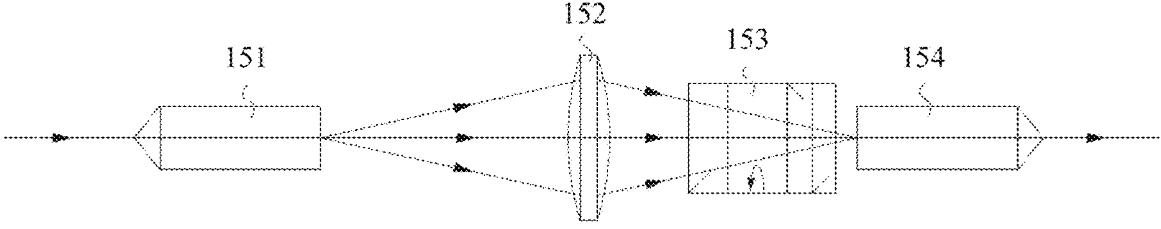
FIG. 15 is a schematic structural diagram of an optical isolator according to an embodiment of the present disclosure.

FIG. 15 is a schematic structural diagram of an optical isolator according to an embodiment of the present disclosure. The optical isolator employs the optical isolator core as described in the above embodiments. The optical isolator core is applicable to a scenario of isolation for polarization independence and non-collimating beam (convergent beam or divergent beam). The optical isolator includes: an input waveguide 151, a lens 152, an optical isolator core 153, and an output waveguide 154 that are successively arranged along a forward optical path.

The optical isolator core 153 is the same as the optical isolator core as described in the above embodiments, and may employ any design of the optical isolator core as described in the above embodiments. For details, reference may be made to the description of the above embodiments of the optical isolator core, which are not described herein any further.

The input waveguide 151 is configured to guide in forward light. The lens 152 is configured to converge the forward light to form forward convergentbeam. The optical isolator core 153 is configured to isolate backward light from the forward convergent beam. The output waveguide 154 is configured to guide out the forward convergent beam traveling through the optical isolator core 153.

Since the optical isolator core 153 may be directly applied to a convergent optical path, the optical isolator only needs one lens to converge the forward light, with no need of collimating the forward light using one lens and then converging the forward light using another lens, like the conventional optical isolator. Therefore, one lens may be saved, and thus structural dimensions and costs of the optical isolator are reduced.

Figure 16:
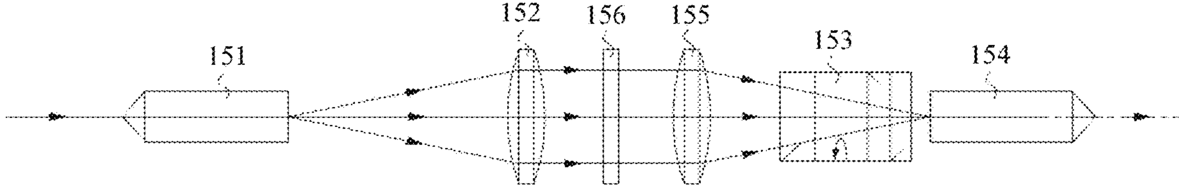
FIG. 16 is a schematic structural diagram of another optical isolator according to an embodiment of the present disclosure.

In one optional embodiment, a second lens 155 may be added in the optical isolator to maintain a possibility of functional expansion in a collimation path. FIG. 16 is a schematic structural diagram of another optical isolator according to an embodiment of the present disclosure. Specifically, the second lens 155 is disposed on a side of an exit surface of forward light of the lens 152, and is close to an incident surface of forward light of the optical isolator core 153. The lens 152 and the second lens 155 are configured to form collimated beam. The second lens 155 is further configured to converge the collimated beam to forward convergent beam. Accordingly, other optical elements may be added in the collimation optical path, for example, an optical filter, to expand an optical isolator having other functions. As illustrated in FIG. 16, an optical element 156 (for example, an optical filter) is disposed between the lens 152 and the second lens 155, and is configured to filter the collimated light. Nevertheless, the optical element 156 may also be other functional elements to expand functions. As such, the optical isolator, in addition to the functions of the optical isolator core as described above, is further capable of filtering or screening specific forward light, or implementing other expanding functions to form a hybrid functional device.

Figure 17:
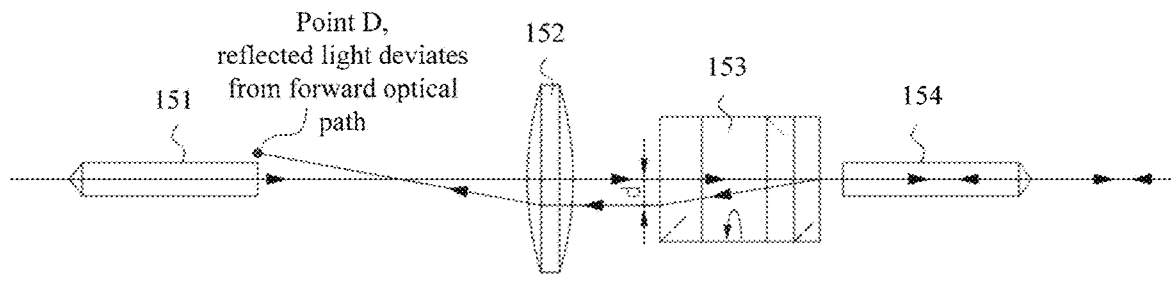
FIG. 17 is a schematic diagram of backward optical isolation of an optical isolator according to an embodiment of the present disclosure.

FIG. 17 is a schematic diagram of backward optical isolation of an optical isolator according to an embodiment of the present disclosure. Description is given using a Principal Ray in the forward light in the optical isolator with the single lens structure as an example. In propagation of forward light, in response to traveling through the lens 152, forward divergent beam exiting from the input waveguide 151 forms forward convergent beam. Subsequently, the forward convergent beam travels through the optical isolator core 153, and is losslessly coupled into the output waveguide 154. In backward propagation of backward light along the forward optical path, in the case that backward divergent beam exiting from the output waveguide 154 travels through the optical isolator core 153, an exit point of the backward light with respect to the incident point of the forward light in response to exiting from the optical isolator core 153 is subjected to a displacement. An amount of the displacement may be d. Afterwards, the backward light enters the lens 152, the backward light refracted by the lens 152 travels through a lens' focal point close to the input waveguide 151, and finally reaches a position D. In this case, the backward light deviates from the input waveguide 151, and thus fails to be coupled into the input waveguide 151. In this way, the backward light is isolated.

It should be noted that the input waveguide 151 or the output waveguide 154 may be single-channeled or multi-channeled. In the case of the multi-channel input waveguide 151 and the multi-channel output waveguide 154, multi-channel of forward light may share the same optical isolator, such that space occupation is reduced and costs are lowered while the backward light is isolated.

In summary, the optical isolator according to the embodiments of the present disclosure, in addition to the functions and effects of the optical isolator core as described in the above embodiments, is further capable of reducing the structural dimensions and costs due to reducing a lens. In addition, for additional functions, other optical elements may also be flexibly added according to actual needs.

Figure 18:
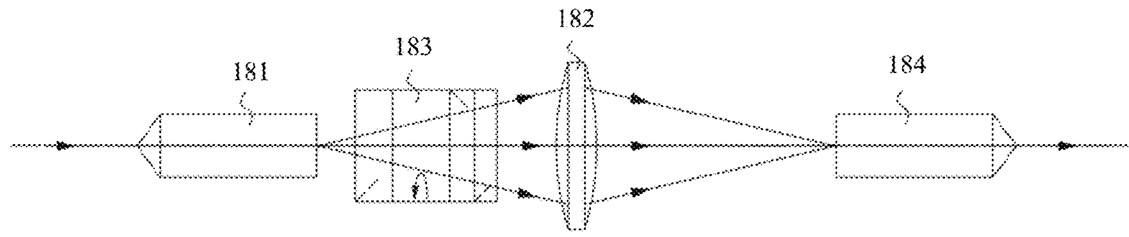
FIG. 18 is a schematic structural diagram of another optical isolator according to an embodiment of the present disclosure.

FIG. 18 is a schematic structural diagram of another optical isolator according to an embodiment of the present disclosure. The optical isolator employs the optical isolator core as described in the above embodiments. The optical isolator core is applicable to a scenario of isolation for polarization independence and non-collimating beam (convergent beam or divergent beam). The optical isolator includes: an input waveguide 181, an optical isolator core 183, a lens 182, and an output waveguide 184 that are successively arranged along a forward optical path.

The optical isolator core 183 is the same as the optical isolator core as described in the above embodiments, and may employ any design of the optical isolator core as described in the above embodiments. For details, reference may be made to the description of the above embodiments of the optical isolator core, which are not described herein any further.

The input waveguide 181 is configured to guide in forward divergent beam. The optical isolator core 183 is configured to isolate backward light from the forward divergent beam. The lens 182 is configured to converge the forward divergent beam traveling through the optical isolator core 183 to form forward convergent beam. The output waveguide 184 is configured to guide out the forward convergent beam.

Since the optical isolator core 183 may be directly applied to a divergent optical path, the optical isolator only needs one lens to converge the forward light, with no need of collimating the forward light using one lens and then converging the forward light using another lens, like the conventional optical isolator. Therefore, one lens may be saved, and thus structural dimensions and costs of the optical isolator are reduced.

Optionally, the optical isolator according to the embodiments of the present disclosure may also be scalable for expanded functions. For details, reference may be made to the description in the above embodiments of the optical isolator, which are not described herein any further.

Likewise, the input waveguide 181 or the output waveguide 184 may be single-channeled or multi-channeled. In the case of the multi-channel input waveguide 181 and the multi-channel output waveguide 184, multi-channels of forward light may share the same optical isolator, such that space occupation is reduced and costs are lowered while the backward light is isolated.

In summary, the optical isolator according to the embodiments of the present disclosure, in addition to the functions and effects of the optical isolator core as described in the above embodiments, is further capable of reducing the structural dimensions and costs due to reducing a lens. In addition, for additional functions, other optical elements may also be flexibly added according to actual needs.

In the specification provided herein, a plenty of particular details are described. However, it may be understood that the embodiments of the present disclosure may also be practiced without these particular details. In some embodiments, well known methods, structures and technologies are not illustrated in detail for clear understanding of the specification.

Likewise, it shall be understood that, to streamline the present disclosure and facilitate understanding of one or more of various aspects of the present disclosure, in the above description of the exemplary embodiments of the present disclosure, various features of the embodiments of the present disclosure are sometimes incorporated in an individual embodiment, drawing or description thereof. However, the method according to the present disclosure shall not be explained to embody the following intention: the present disclosure for which protection is sought claims more features than those explicitly disclosed in each of the appended claims.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, sub-units or subcomponents. Except that at least some of such features and/or processes or units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

It should be noted that the above embodiments illustrate rather than limit the present disclosure, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The article "a" or "an" used before an element does not exclude the presence of a plurality of such elements. The present disclosure may be implemented by means of a hardware including several distinct elements and by means of a suitably programmed computer. In a unit claim enumerating several devices, several of the devices may be embodied by one and the same hardware item. Use of the words "first," "second," "third," and the like does not mean any ordering. Such words may be construed as naming. The steps in the above embodiments, unless otherwise specified, shall not be understood as causing limitations to the execution order.

What is claimed is:

1. An optical isolator core for non-collimating beam, the optical isolator core for non-collimating beam being configured to isolate backward light for the non-collimating beam, the non-collimating beam being convergent beam or divergent beam, the optical isolator core for non-collimating beam comprising: a first birefringent crystal, a Faraday rotator, a second birefringent crystal, and a third birefringent crystal that are successively arranged along a forward optical path, the first birefringent crystal, the Faraday rotator, the second birefringent crystal, and the third birefringent crystal being all parallel plate structures;

wherein in the case that forward light is incident on the first birefringent crystal, the first birefringent crystal is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the Faraday rotator is configured to respectively rotate, at a rotation angle $\alpha$, the polarization directions of the first crystal forward o light and the first crystal forward e light to form rotated first crystal forward o light and rotated first crystal forward e light; the second birefringent crystal is configured to cause the rotated first crystal forward o light and the rotated first crystal forward e light to respectively generate a second displacement of the first crystal forward o light and a second displacement of the first crystal forward e light; and the third birefringent crystal is configured to cause the first crystal forward o light and the first crystal forward e light that travel through the second birefringent crystal to respectively generate a third displacement of the first crystal forward o light and a third displacement of the first crystal forward e light; wherein the forward light is non-collimating beam;

wherein a sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal;

wherein in the case that backward light entering backward along the forward optical path is incident on the third birefringent crystal, the third birefringent crystal is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the second birefringent crystal is configured to cause the third crystal backward o light and the third crystal backward e light that travel through the third birefringent crystal to respectively generate a second displacement of the third crystal backward o light and a second displacement of the third crystal backward e light; the Faraday rotator is configured to respectively rotate, at the rotation angle $\alpha$ and along the same direction of the forward light, the polarization directions of the third crystal backward o light and the third crystal backward e light that travel through the second birefringent crystal to form rotated third crystal backward o light and rotated third crystal backward e light; and the first birefringent crystal is configured to cause the rotated third crystal backward o light and the rotated third crystal backward e light to respectively generate a first displacement of the third crystal backward o light and a first displacement of the third crystal backward e light;

wherein a sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

2. The optical isolator core for non-collimating beam according to claim 1, wherein a projection angle of an optical axis of the first birefringent crystal on an incident surface of the forward light is $\phi 1$, a projection angle of an optical axis of the second birefringent crystal on the incident surface of the forward light is $\phi 2$, and a projection angle of an optical axis of the third birefringent crystal on an incident surface of the forward light is $\phi 3$;

wherein a value of $\phi 1$ satisfies: $0° \leq \phi 1 \leq 360°$, a relationship between $\phi 2$ and $\phi 1$ satisfies: $|\phi 2-\phi 1|=\alpha$, $90°+\alpha$, $180°+\alpha$ or $270°+\alpha$, and a relationship between $\phi 3$ and $\phi 2$ satisfies: $|\phi 3-\phi 2|=90° \pm 20°$ or $270° \pm 20°$.

3. The optical isolator core for non-collimating beam according to claim 1, wherein an included angle $\theta$ between an optical axis of the birefringent crystal and a normal of an incident surface of the forward light is a walk-off angle, wherein a value of $\theta$ satisfies: $0°<\theta<90°$ or $-90°<\theta<0°$, and the walk-off angle is configured to control a relative walk-off between an exiting o light and an exiting e light in response to the light traveling through the birefringent crystal.

4. The optical isolator core for non-collimating beam according to claim 1, wherein the second birefringent crystal is further configured to cause the first crystal forward o light rotated by the Faraday rotator to be still propagated in an o light polarization state when traveling through the second birefringent crystal, and cause the first crystal forward e light rotated by the Faraday rotator to be still propagated in an e light polarization state when traveling through the second birefringent crystal; and the third birefringent crystal is further configured to cause the first crystal forward o light traveling through the second birefringent crystal to be propagated in the e light polarization state when traveling through the third birefringent crystal, and cause the first crystal forward e light traveling through the second birefringent crystal to be propagated in the o light polarization state when traveling through the third birefringent crystal.

5. The optical isolator core for non-collimating beam according to claim 1, wherein the second birefringent crystal is further configured to cause the first crystal forward o light rotated by the Faraday rotator to be propagated in an e light polarization state when traveling through the second birefringent crystal, and cause the first crystal forward e light rotated by the Faraday rotator to be propagated in an o light polarization state when traveling through the second birefringent crystal; and the third birefringent crystal is further configured to cause the first crystal forward o light traveling through the second birefringent crystal to be still propagated in the o light polarization state when traveling through the third birefringent crystal, and cause the first crystal forward e light traveling through the second birefringent crystal to be still propagated in the e light polarization state when traveling through the third birefringent crystal.

6. An optical isolator core for non-collimating beam, the optical isolator core for non-collimating beam being configured to isolate backward light for the non-collimating beam, the non-collimating beam being convergent beam or divergent beam, the optical isolator core for non-collimating beam comprising: a first birefringent crystal, a second birefringent crystal, a Faraday rotator, and a third birefringent crystal that are successively arranged along a forward optical path, the first birefringent crystal, the second birefringent crystal, the Faraday rotator, and the third birefringent crystal being all parallel plate structures;

wherein in the case that forward light is incident on the first birefringent crystal, the first birefringent crystal is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the second birefringent crystal is configured to cause the first crystal forward o light and the first crystal forward e light to respectively generate a second displacement of the first crystal forward o light and a second displacement of the first crystal forward e light; the Faraday rotator is configured to respectively rotate, at a rotation angle α, the polarization directions of the first crystal forward o light and the first crystal forward e light that travel through the second birefringent crystal to form rotated first crystal forward o light and rotated first crystal forward e light; and the third birefringent crystal is configured to cause the rotated first crystal forward o light and the rotated first crystal forward e light to respectively generate a third displacement of the first crystal forward o light and a third displacement of the first crystal forward e light; wherein the forward light is non-collimating beam;

wherein a sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal;

wherein in the case that backward light entering backward along the forward optical path is incident on the third birefringent crystal, the third birefringent crystal is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the Faraday rotator is configured to respectively rotate, at the rotation angle α and along the same direction of the forward light, the polarization directions of the third crystal backward o light and the third crystal backward e light to form rotated third crystal backward o light and rotated third crystal backward e light; the second birefringent crystal is configured to cause the rotated third crystal backward o light and the rotated third crystal backward e light to respectively generate a second displacement of the third crystal backward o light and a second displacement of the third crystal backward e light; and the first birefringent crystal is configured to cause the third crystal backward o light and the third crystal backward e light that travel through the second birefringent crystal to respectively generate a first displacement of the third crystal backward o light and a first displacement of the third crystal backward e light;

wherein a sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

7. The optical isolator core for non-collimating beam according to claim 6, wherein a projection angle of an optical axis of the first birefringent crystal on an incident surface of the forward light is $\phi 1$, a projection angle of an optical axis of the second birefringent crystal on the incident surface of the forward light is $\phi 2$, and a projection angle of an optical axis of the third birefringent crystal on an incident surface of the forward light is $\phi 3$;

wherein a value of $\phi 3$ satisfies: $0° \leq \phi 3 \leq 360°$, a relationship between $\phi 2$ and $\phi 3$ satisfies: $|\phi 2 - \phi 3| = \alpha$, $90° + \alpha$, $180° + \alpha$ or $270° + \alpha$, and a relationship between $\phi 1$ and $\phi 2$ satisfies: $|\phi 1 - \phi 2| = 90° \pm 20°$ or $270° \pm 20°$.

8. The optical isolator core for non-collimating beam according to claim 6, wherein an included angle θ between an optical axis of the birefringent crystal and a normal of an incident surface of the forward light is a walk-off angle, wherein a value of θ satisfies: $0° < \theta < 90°$ or $-90° < \theta < 0°$, and the walk-off angle is configured to control a relative walk-off between an exiting o light and an exiting e light in response to the light traveling through the birefringent crystal.

9. The optical isolator core for non-collimating beam according claim 6, wherein the second birefringent crystal is further configured to cause the first crystal forward o light to be propagated in an e light polarization state when traveling through the second birefringent crystal, and cause the first crystal forward e light to be propagated in an o light polarization state when traveling through the second birefringent crystal; and the third birefringent crystal is further configured to cause the first crystal forward o light rotated by the Faraday rotator to be still propagated in an o light polarization state when traveling through the third birefringent crystal, and cause the first crystal forward e light rotated by the Faraday rotator to be still propagated in an e light polarization state when traveling through the third birefringent crystal.

10. The optical isolator core for non-collimating beam according claim 6, wherein the second birefringent crystal is further configured to cause the first crystal forward o light to be propagated in an e light polarization state when traveling through the second birefringent crystal, and cause the first crystal forward e light to be propagated in an o light polarization state when traveling through the second birefringent crystal; and the third birefringent crystal is further configured to cause the first crystal forward o light rotated by the Faraday rotator to be propagated in the e light polarization state when traveling through the third birefringent crystal, and cause the first crystal forward e light rotated by the Faraday rotator to be propagated in the o light polarization state when traveling through the third birefringent crystal.

11. An optical isolator, the optical isolator adopting a design of non-collimating beam to achieve isolating backward light, the optical isolator comprising: an input waveguide, a lens unit, an optical isolator core for non-collimating beam and an output waveguide that are successively arranged along a forward optical path; wherein the input waveguide is configured to guide in forward light, the forward light being output from the input waveguide as divergent beam;

the lens unit being configured to converge the divergent beam to form forward convergent beam;

the optical isolator core for non-collimating beam being configured to forward couple the forward convergent beam and isolate the backward light;

the output waveguide being configured to guide out the forward convergent beam traveling through the optical isolator core for non-collimating beam;

wherein the optical isolator core for non-collimating beam comprises: a first birefringent crystal, a Faraday rotator, a second birefringent crystal, and a third birefringent crystal that are successively arranged along a forward optical path, the first birefringent crystal, the Faraday rotator, the second birefringent crystal, and the third birefringent crystal being all parallel plate structures;

wherein in the case that forward light is incident on the first birefringent crystal, the first birefringent crystal is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the Faraday rotator is configured to respectively rotate, at a rotation angle $\alpha$, the polarization directions of the first crystal forward o light and the first crystal forward e light to form rotated first crystal forward o light and rotated first crystal forward e light; the second birefringent crystal is configured to cause the rotated first crystal forward o light and the rotated first crystal forward e light to respectively generate a second displacement of the first crystal forward o light and a second displacement of the first crystal forward e light; and the third birefringent crystal is configured to cause the first crystal forward o light and the first crystal forward e light that travel through the second birefringent crystal to respectively generate a third displacement of the first crystal forward o light and a third displacement of the first crystal forward e light; wherein the forward light is non-collimating beam;

wherein a sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal;

wherein in the case that backward light entering backward along the forward optical path is incident on the third birefringent crystal, the third birefringent crystal is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the second birefringent crystal is configured to cause the third crystal backward o light and the third crystal backward e light that travel through the third birefringent crystal to respectively generate a second displacement of the third crystal backward o light and a second displacement of the third crystal backward e light; the Faraday rotator is configured to respectively rotate, at the rotation angle $\alpha$ and along the same direction of the forward light, the polarization directions of the third crystal backward o light and the third crystal backward e light that travel through the second birefringent crystal to form rotated third crystal backward o light and rotated third crystal backward e light; and the first birefringent crystal is configured to cause the rotated third crystal backward o light and the rotated third crystal backward e light to respectively generate a first displacement of the third crystal backward o light and a first displacement of the third crystal backward e light;

wherein a sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

12. The optical isolator according to claim 11, wherein a projection angle of an optical axis of the first birefringent crystal on an incident surface of the forward light is $\phi 1$, a projection angle of an optical axis of the second birefringent crystal on the incident surface of the forward light is $\phi 2$, and a projection angle of an optical axis of the third birefringent crystal on an incident surface of the forward light is $\phi 3$;

wherein a value of $\phi 1$ satisfies: $0° \leq \phi 1 \leq 360°$, a relationship between $\phi 2$ and $\phi 1$ satisfies: $|\phi 2-\phi 1|=\alpha$, $90°\pm\alpha$, $180°+\alpha$ or $270°\pm\alpha$, and a relationship between $\varphi 3$ and $\phi 2$ satisfies: $|\phi 3-\phi 2|=90°\pm 20°$ or $270°\pm 20°$.

13. The optical isolator according to claim 11, wherein an included angle $\theta$ between an optical axis of the birefringent crystal and a normal of an incident surface of the forward light is a walk-off angle, wherein a value of $\theta$ satisfies: $0°<\theta<90°$ or $-90°<\theta<0°$, and the walk-off angle is configured to control a relative walk-off between an exiting o light and an exiting e light in response to the light traveling through the birefringent crystal.

14. The optical isolator according to claim 11, wherein the second birefringent crystal is further configured to cause the first crystal forward o light rotated by the Faraday rotator to be still propagated in an o light polarization state when traveling through the second birefringent crystal, and cause the first crystal forward e light rotated by the Faraday rotator to be still propagated in an e light polarization state when traveling through the second birefringent crystal; and the third birefringent crystal is further configured to cause the first crystal forward o light traveling through the second birefringent crystal to be propagated in the e light polarization state when traveling through the third birefringent crystal, and cause the first crystal forward e light traveling through the second birefringent crystal to be propagated in the o light polarization state when traveling through the third birefringent crystal.

15. The optical isolator according to claim 11, wherein the second birefringent crystal is further configured to cause the first crystal forward o light rotated by the Faraday rotator to be propagated in an e light polarization state when traveling through the second birefringent crystal, and cause the first crystal forward e light rotated by the Faraday rotator to be propagated in an o light polarization state when traveling through the second birefringent crystal; and the third birefringent crystal is further configured to cause the first crystal forward o light traveling through the second birefringent crystal to be still propagated in the o light polarization state when traveling through the third birefringent crystal, and cause the first crystal forward e light traveling through the second birefringent crystal to be still propagated in the e light polarization state when traveling through the third birefringent crystal.

16. An optical isolator, the optical isolator adopting a design of non-collimating beam to achieve isolating backward light, the optical isolator comprising: an input waveguide, an optical isolator core for non-collimating beam, a lens unit, and an output waveguide that are successively arranged along a forward optical path; wherein the input waveguide is configured to guide in forward light; the forward light being output from the input waveguide as forward divergent beam;

the optical isolator core for non-collimating beam being configured to couple the forward divergent beam and isolate backward light;

the lens unit being configured to converge the forward light traveling through the optical isolator core for non-collimating beam to form a forward convergent beam;

the output waveguide being configured to guide out the forward convergent beam;

wherein the optical isolator core for non-collimating beam comprises: a first birefringent crystal, a second birefringent crystal, a Faraday rotator, and a third birefringent crystal that are successively arranged along a forward optical path, the first birefringent crystal, the second birefringent crystal, the Faraday rotator, and the third birefringent crystal being all parallel plate structures;

wherein in the case that forward light is incident on the first birefringent crystal, the first birefringent crystal is configured to separate the forward light into first crystal forward o light and first crystal forward e light whose polarization directions are perpendicular to each other, such that the first crystal forward o light and the first crystal forward e light respectively generate a first displacement of the first crystal forward o light and a first displacement of the first crystal forward e light; the second birefringent crystal is configured to cause the first crystal forward o light and the first crystal forward e light to respectively generate a second displacement of the first crystal forward o light and a second displacement of the first crystal forward e light; the Faraday rotator is configured to respectively rotate, at a rotation angle $\alpha$, the polarization directions of the first crystal forward o light and the first crystal forward e light that travel through the second birefringent crystal to form rotated first crystal forward o light and rotated first crystal forward e light; and the third birefringent crystal is configured to cause the rotated first crystal forward o light and the rotated first crystal forward e light to respectively generate a third displacement of the first crystal forward o light and a third displacement of the first crystal forward e light; wherein the forward light is non-collimating beam;

wherein a sum of the first displacement of the first crystal forward o light, the second displacement of the first crystal forward o light, and the third displacement of the first crystal forward o light is equal to a sum of the first displacement of the first crystal forward e light, the second displacement of the first crystal forward e light, and the third displacement of the first crystal forward e light, and the first crystal forward o light and the first crystal forward e light are coincident with each other in response to exiting from the third birefringent crystal;

wherein in the case that backward light entering backward along the forward optical path is incident on the third birefringent crystal, the third birefringent crystal is configured to separate the backward light into a third crystal backward o light and a third crystal backward e light whose polarization directions are perpendicular to each other, such that the third crystal backward o light and the third crystal backward e light respectively generate a third displacement of the third crystal backward o light and a third displacement of the third crystal backward e light; the Faraday rotator is configured to respectively rotate, at the rotation angle $\alpha$ and along the same direction of the forward light, the polarization directions of the third crystal backward o light and the third crystal backward e light to form rotated third crystal backward o light and rotated third crystal backward e light; the second birefringent crystal is configured to cause the rotated third crystal backward o light and the rotated third crystal backward e light to respectively generate a second displacement of the third crystal backward o light and a second displacement of the third crystal backward e light; and the first birefringent crystal is configured to cause the third crystal backward o light and the third crystal backward e light that travel through the second birefringent crystal to respectively generate a first displacement of the third crystal backward o light and a first displacement of the third crystal backward e light;

wherein a sum of the first displacement of the third crystal backward o light, the second displacement of the third crystal backward o light, and the third displacement of the third crystal backward o light causes the third crystal backward o light to deviate from the forward optical path, and a sum of the first displacement of the third crystal backward e light, the second displacement of the third crystal backward e light, and the third displacement of the third crystal backward e light causes the third crystal backward e light to deviate from the forward optical path.

17. The optical isolator according to claim 16, wherein a projection angle of an optical axis of the first birefringent crystal on an incident surface of the forward light is $\phi 1$, a projection angle of an optical axis of the second birefringent crystal on the incident surface of the forward light is $\phi 2$, and a projection angle of an optical axis of the third birefringent crystal on an incident surface of the forward light is $\phi 3$;

wherein a value of $\phi 3$ satisfies: $0° \leq \phi 3 \leq 360°$, a relationship between $\phi 2$ and $\phi 3$ satisfies: $|\phi 2-\phi 3|=\alpha$, $90°+\alpha$, $180°+\alpha$ or $270°+\alpha$, and a relationship between $\phi 1$ and $\phi 2$ satisfies: $|\phi 1-\phi 2|=90°\pm 20°$ or $270°\pm 20°$.

18. The optical isolator according to claim 16, wherein an included angle $\theta$ between an optical axis of the birefringent crystal and a normal of an incident surface of the forward light is a walk-off angle, wherein a value of $\theta$ satisfies: $0°<\theta<90°$ or $-90°<\theta<0°$, and the walk-off angle is configured to control a relative walk-off between an exiting o light and an exiting e light in response to the light traveling through the birefringent crystal.

19. The optical isolator according claim 16, wherein the second birefringent crystal is further configured to cause the first crystal forward o light to be propagated in an e light polarization state when traveling through the second birefringent crystal, and cause the first crystal forward e light to be propagated in an o light polarization state when traveling through the second birefringent crystal; and the third birefringent crystal is further configured to cause the first crystal forward o light rotated by the Faraday rotator to be still propagated in an o light polarization state when traveling through the third birefringent crystal, and cause the first crystal forward e light rotated by the Faraday rotator to be still propagated in an e light polarization state when traveling through the third birefringent crystal.

20. The optical isolator according claim 16, wherein the second birefringent crystal is further configured to cause the first crystal forward o light to be propagated in an e light polarization state when traveling through the second birefringent crystal, and cause the first crystal forward e light to be propagated in an o light polarization state when traveling through the second birefringent crystal; and the third birefringent crystal is further configured to cause the first crystal forward o light rotated by the Faraday rotator to be propagated in the e light polarization state when traveling through the third birefringent crystal, and cause the first crystal forward e light rotated by the Faraday rotator to be propagated in the o light polarization state when traveling through the third birefringent crystal.

* * * * *